US009386548B2

(12) United States Patent
Ishihara et al.

(10) Patent No.: US 9,386,548 B2
(45) Date of Patent: Jul. 5, 2016

(54) BASE STATION APPARATUS, COMMUNICATION SYSTEM AND SYNCHRONIZATION METHOD

(71) Applicant: Panasonic Intellectual Property Management Co., Ltd., Osaka (JP)

(72) Inventors: Hiroyuki Ishihara, Fukuoka (JP); Yutaka Suwa, Fukuoka (JP); Akira Shibuta, Fukuoka (JP)

(73) Assignee: Panasonic Corporation, Osaka (JP)

( * ) Notice: Subject to any disclaimer, the term of this patent is extended or adjusted under 35 U.S.C. 154(b) by 227 days.

(21) Appl. No.: 13/865,615

(22) Filed: Apr. 18, 2013

(65) Prior Publication Data

US 2013/0279483 A1 Oct. 24, 2013
US 2014/0169342 A9 Jun. 19, 2014

(30) Foreign Application Priority Data

Apr. 20, 2012 (JP) ................................. 2012-096667

(51) Int. Cl.
*H04W 56/00* (2009.01)
*H04J 3/06* (2006.01)

(52) U.S. Cl.
CPC ............. *H04W 56/00* (2013.01); *H04J 3/0641* (2013.01); *H04J 3/0658* (2013.01); *H04W 56/0015* (2013.01)

(58) Field of Classification Search
None
See application file for complete search history.

(56) References Cited

U.S. PATENT DOCUMENTS

| 6,816,510 | B1* | 11/2004 | Banerjee ................ H04B 7/269 370/350 |
|---|---|---|---|
| 7,024,194 | B1 | 4/2006 | Oksanen |
| 7,190,703 | B1 | 3/2007 | Heitmann |
| 7,447,237 | B2 | 11/2008 | Koshino |
| 7,613,212 | B1* | 11/2009 | Raz et al. ....................... 370/510 |
| 2002/0187749 | A1* | 12/2002 | Beasley ............... H04B 7/2662 455/41.1 |
| 2004/0109474 | A1 | 6/2004 | Koshino |
| 2005/0259722 | A1* | 11/2005 | Vanlonden ............. H04B 15/04 375/145 |
| 2009/0122782 | A1 | 5/2009 | Horn et al. |
| 2011/0085540 | A1* | 4/2011 | Kuwabara ......... H04W 56/0015 370/350 |

FOREIGN PATENT DOCUMENTS

| EP | 2 293 629 A1 | 3/2011 |
|---|---|---|
| JP | 10-304437 | 11/1998 |
| JP | 2002-165269 | 6/2002 |
| JP | 2002-524967 | 8/2002 |
| JP | 2003-509973 | 3/2003 |
| JP | 2004-186877 | 7/2004 |
| JP | 2004-260382 | 9/2004 |

OTHER PUBLICATIONS

International Search Report, mailed Jul. 17, 2013, for corresponding International Application No. PCT/JP2013/062312, 9 pages.

* cited by examiner

*Primary Examiner* — Hassan Phillips
*Assistant Examiner* — Ayanah George
(74) *Attorney, Agent, or Firm* — Seed IP Law Group PLLC

(57) ABSTRACT

A base station apparatus includes a wireless communication unit, a wired communication unit, and a communication timing correction unit. If the wireless communication unit fails to receive a synchronization signal from another base station apparatus at given reception timing, the wired communication unit transmits a synchronization state confirmation signal for confirming a synchronization state between the base station and another base station apparatus, and receives a synchronization state response signal including a determination result of the synchronization state. The communication timing correction unit corrects a communication timing based on the synchronization state response signal.

20 Claims, 16 Drawing Sheets

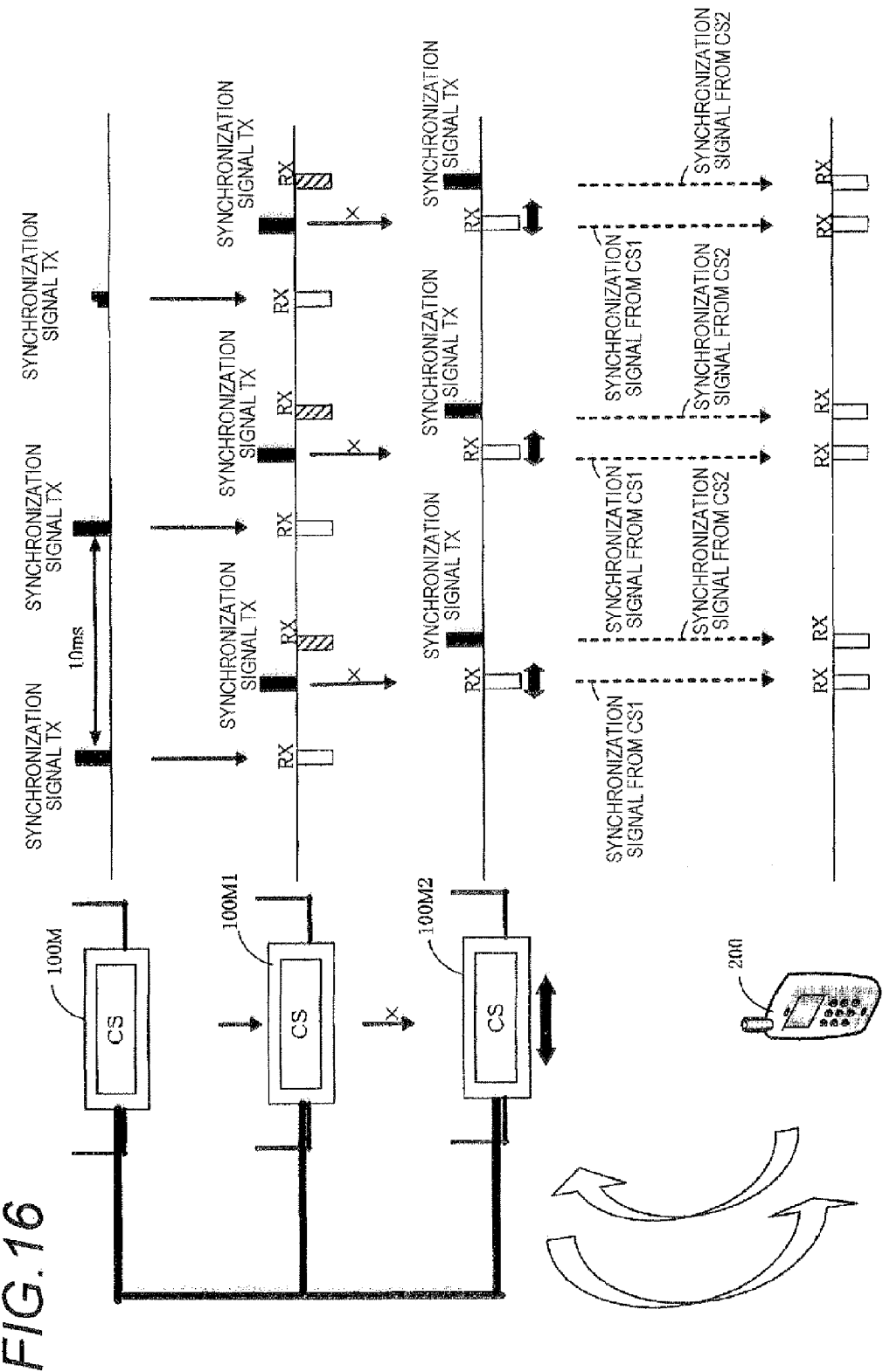

BASE STATION APPARATUS, COMMUNICATION SYSTEM AND SYNCHRONIZATION METHOD

BACKGROUND

1. Field of the Invention

The present invention relates to a base station apparatus, a communication system and a synchronization method.

2. Description of the Related Art

In a related art communication system (for example, PBX (private branch exchange) wireless system), a communication terminal can move while sequentially switches a base station apparatus (hereinafter referred to merely as "base station") to be communicated to another among a plurality of base stations. This switching of the base station is called "handover". In order that the communication terminal preferably conducts the handover, the plurality of base stations needs to mutually synchronize their time information with each other.

As a method of synchronizing the plurality of base stations with each other, the following method has been known. A time information server transmits the time information to the plurality of base stations through a LAN (local area network). Then, each of the base stations adjusts a clock generator installed within the own base station based on a reception time point of the time information and the time information (for example, refer to JP-T-2003-509973).

Likewise, the following method has been also known. A mobile station selectively connects to one or more base stations, and communicates with the connected base stations at given timing. Among the base stations, a base station that generates a transmission timing and a reception timing is set to a higher level of a hierarchy as a reference station. The other base stations other than the reference signal select a base station higher hierarchy, and set the transmission timing and the reception timing. The base stations correct a deviation of the transmission timing and the reception timing from the base station of a synchronization partner at given time intervals (for example, refer to JP-A-2002-165269).

Likewise, the following method has been known. The synchronization server transmits a synchronization message including information on clocks periodically generated to the respective base stations as an IP packet. Each base station receives the synchronization message from the synchronization server. Each base station calculates a clock correction value based on a time at which the synchronization message is received, and the information on the clock notified by the synchronization message, and corrects the clock at each base station based on the clock correction value (for example, refer to JP-A-2004-186877).

SUMMARY

In a normal time, each of the base stations periodically receives a synchronization signal in order to be synchronized with the other base stations. On the other hand, each of the base stations comes out of synchronization with the other base stations if the base station fails to detect the synchronization signal. As a result, each base station may be unable to synchronize with the other base stations with high precision apart from restart.

In the technique of JP-T-2003-509973, when a clock function of the time information server stops, the plurality of base stations cannot be synchronized with each other with high precision. In the technique of JP-A-2002-165269, when a timing generation function of the reference station stops, the plurality of base stations cannot be synchronized with each other with high precision. In the technique of JP-A-2004-186877, when the function of the synchronization server stops, the plurality of base stations cannot be synchronized with each other with high precision.

One unlimited object of the present invention is to provide a base station apparatus, a communication system and a synchronization method, in which a plurality of base stations can be synchronized with each other with high precision.

There is provided a base station apparatus that communicates with another base station apparatus by a time-sharing system, the base station apparatus including: a wireless communication unit that communicates with the another base station apparatus through a wireless network; a wired communication unit that communicates with the another base station apparatus through a wired network; a communication timing determination unit that determines a communication timing of a communication signal communicated by the wireless communication unit; and a communication timing correction unit that corrects the communication timing determined by the communication timing determination unit, wherein if the wireless communication unit fails to receive a synchronization signal from the another base station apparatus at given reception timing, the wired communication unit transmits a synchronization state confirmation signal for confirming a synchronization state between the base station apparatus and the another base station apparatus, and receives a synchronization state response signal including a determination result of the synchronization state, and the communication timing correction unit corrects the communication timing based on the synchronization state response signal received by the wired communication unit.

According to the present invention, even if the given synchronization signal is not received, the plurality of base stations can be synchronized with each other with high precision.

BRIEF DESCRIPTION OF THE DRAWINGS

FIG. 16 is a diagram illustrating an example of transmission/reception timing of the synchronization signal in the undetected state of the base station apparatus, and a reception timing of the synchronization signal of the communication terminal according to the embodiment of the present invention.

DETAILED DESCRIPTION

Hereinafter, embodiments of the present invention will be described with reference to the accompanying drawings.

First Embodiment

Figure 1:
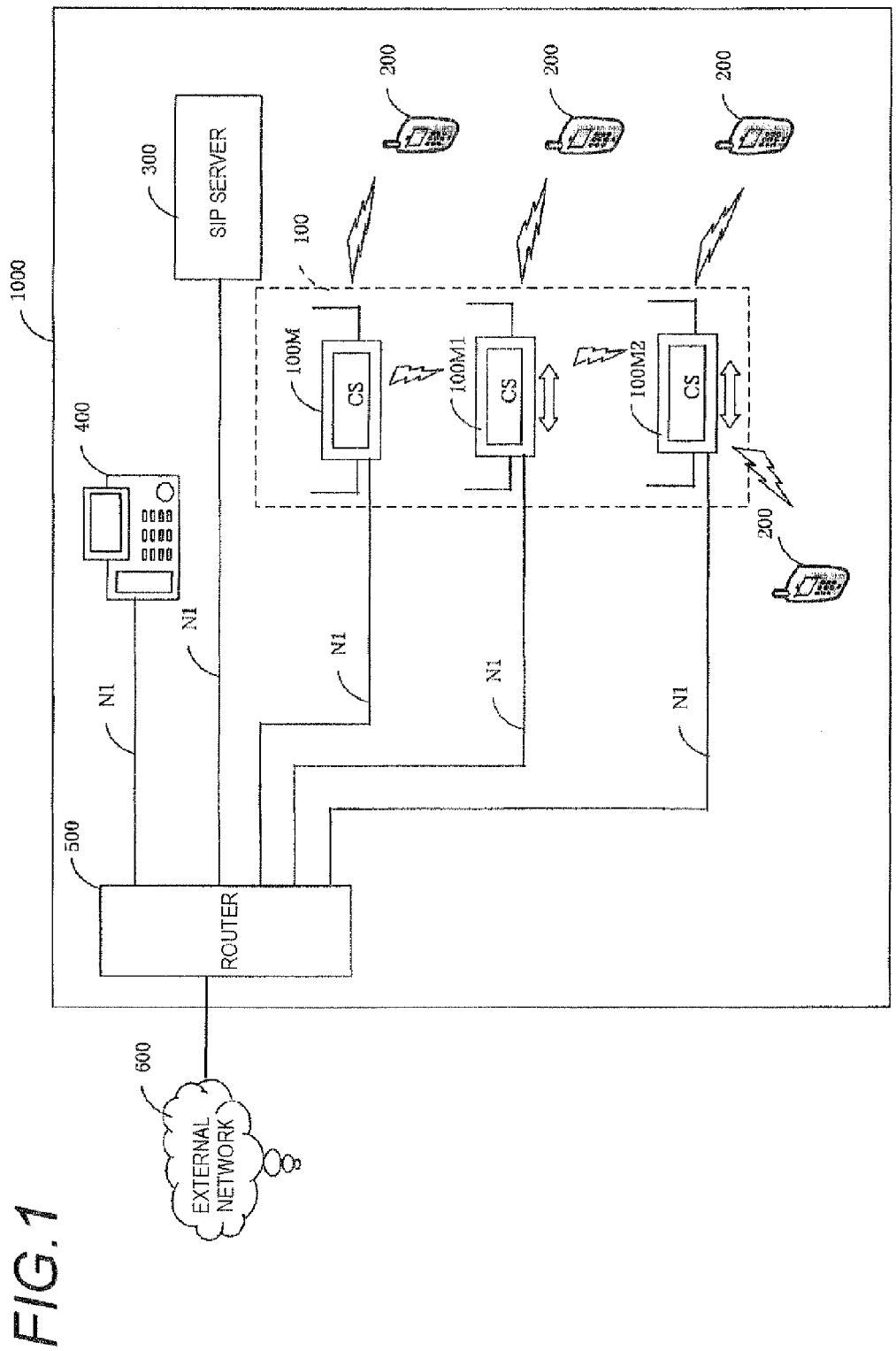
FIG. 1 is a block diagram illustrating a configuration example of a communication system according to an embodiment of the present invention.

FIG. 1 is a diagram illustrating a configuration example of a communication system 1000 according to a first embodiment of the present invention. A communication system 1000 includes base station apparatuses (CS: cell stations) 100, communication terminals (PS: personal stations) 200, a SIP (session initiation protocol) server 300, a telephone 400, and a router 500.

A plurality of base station apparatuses 100 is hierarchically present within the communication system 1000. In FIG. 1, the plurality of CSs 100 is called CS 100M, CS 100M1, and CS 100M2. Referring to FIG. 1, the CS 100M is a device (timing master CS) which is arranged in the highest level hierarchy, and is, for example, a reference of synchronization. The CS 100M1 and CS 100M2 are devices (Slave CS) which are arranged in a lower level hierarchy than that of the CS 100M, and operate based on the synchronization reference of the CS 100M. The CS 100M1 and the CS 100M2 may be also hierarchically arranged. For example, the CS 100M1 is arranged in a higher level hierarchy than that of the CS 100M2.

The PSs 200 are movable communication terminals that operate as handsets. The PSs 200 are, for example, cellular phones, personal digital assistances (PDA), or portable sensor devices. The PSs 200 acquire position information by using a GPS function provided in the PSs 200, and conducts handover to the CSs 100 based on the acquired position information.

The SIP server 300 associates, for example, telephone numbers with IP addresses by the aid of a SIP protocol, and executes call control processing for calling and connecting a communication partner.

The telephone 400 is, for example, an extension phone which communicates with another telephone (for example, PS 200) through the SIP server 300.

The router 500 connects the communication system 1000 with an external network 600, and relays data in the base station apparatuses 100 and data in the external network 600. Also, the router 500, the CSs 100, the PSs 200, the SIP server 300, and the telephone 400 are connected to each other through a wired network (for example, IP network).

Subsequently, a configuration example of the CSs 100 will be described.

Figure 2:
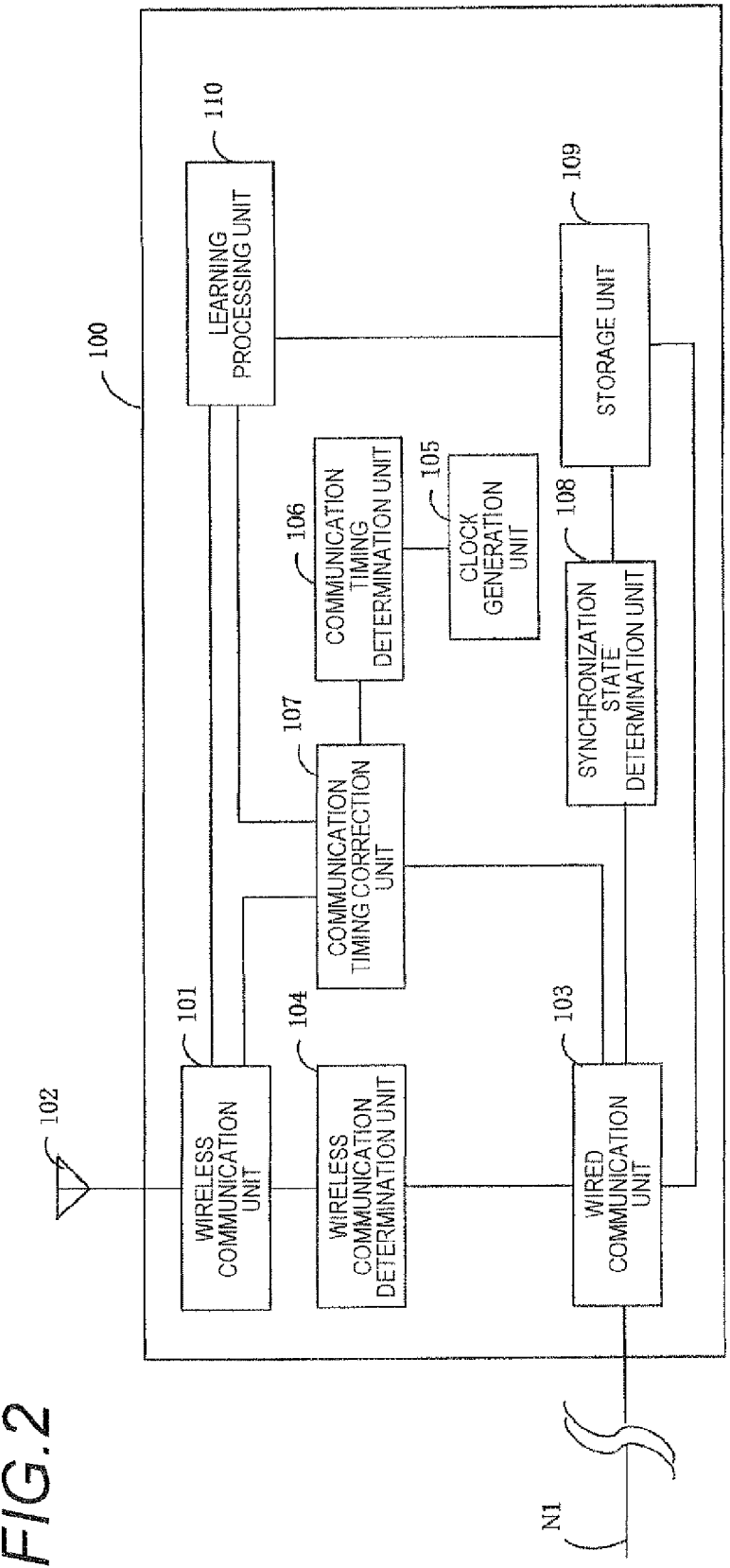
FIG. 2 is a block diagram illustrating a configuration example of a base station apparatus according to the embodiment of the present invention.

FIG. 2 is a block diagram illustrating a configuration example of the CSs 100.

Each of the CSs 100 includes a wireless communication unit 101, an antenna unit 102, a wired communication unit 103, a wireless communication determination unit 104, a clock generation unit 105, a communication timing determination unit 106, a communication timing correction unit 107, a synchronization state determination unit 108, a storage unit 109, and a learning processing unit 110.

The wireless communication unit 101 communicates with another communication device through the antenna unit 102 and a wireless network. The wireless network is, for example, a wireless communication network using a DECT (digital enhanced cordless telecommunication) system.

The wired communication unit 103 communicates with another communication device through the wired network. The wired network is, for example, a wired LAN, a wired WAN, or a power line.

Hereinafter, a description will be given of a case in which each of the CSs 100 transmits and receives a synchronization state confirmation signal and a synchronization state response signal by the aid of the wired communication unit 103. For example, when the CS 100 fails to receive a synchronization signal from the master CS by the aid of the wireless communication unit 101 at a given timing, the CS 100 transmits a synchronization state confirmation signal for confirming the synchronization state to another CS by the aid of the wired communication unit 103 through the wired network. Also, another CS 100 receives the synchronization state confirmation signal transmitted from the CS, which cannot receive the synchronization signal through the wired network, by the aid of the wired communication unit 103.

Also, when another CS transmits the synchronization state response signal which is responsive to the synchronization state confirmation signal through the wired network by the aid of the wired communication unit 103, the wired communication unit 103 of the CS that has transmitted the above-mentioned synchronization state confirmation signal receives the synchronization state response signal. That is, another CS that requests the confirmation by the synchronization state confirmation signal determines the synchronization state by the synchronization state determination unit 108, and transmits the synchronization state response signal including the determination result to another CS which is a determination request source of the synchronization state by the aid of the wired communication unit 103. The synchronization state response signal includes the determination result of the synchronization state.

The wireless communication determination unit 104 determines whether the wireless communication unit 101 normally receives the synchronization signal from the master CS, or not. That is, the wireless communication determination unit 104 determines whether the wireless communication unit 101 detects the synchronization signal, and receives the synchronization signal at the given reception timing, or not. The synchronization signal is undetected, for example, when a power supply of another CS that transmits the synchronization signal to the CS is off, or when radio wave interference is generated at the reception timing of the synchronization signal.

The clock generation unit 105 generates a reference clock for operating the respective units in the CS 100, and determining the communication timing of the wireless communication unit 101.

The communication timing determination unit 106 determines the communication timing of the communication signal from the wireless communication unit 101 based on the reference clock of the clock generation unit 105. The communication signal includes the synchronization signal for synchronizing with another CS 100.

The communication timing correction unit 107 corrects the communication timing at which the wireless communication unit 101 communicates, for example, based on the synchronization signal acquired from another CS 100 through the wired network. The communication timing includes at least one of the transmission timing and the reception timing of the wireless communication unit 101.

The wireless synchronization of a certain CS 100 may be conducted, for example, according to the synchronization signal from another CS 100 arranged in the higher level hierarchy. For example, the CS 100M1 is synchronized with the synchronization signal from the CS 100M which is a master of the CS 100M1, and the CS 100M2 is synchronized with the synchronization signal from the CS 100M which is the master, or the CS 100M1. Accordingly, the communication timing correction unit 107 of each CS corrects the communication timing according to the synchronization signal from the CS arranged in the high level hierarchy. When the communication timing is corrected, the reference clock of the CS 100 may be corrected by a clock correction unit not shown.

Also, when the synchronization state determination unit 108 of a certain CS is requested by the above-mentioned synchronization state confirmation signal from another CS to determine the synchronization state, the synchronization state determination unit 108 attempts to receive the synchronization signal of another CS (determination request source) at a given slot. If the synchronization state determination unit 108 has received the synchronization signal, the synchronization state determination unit 108 measures a deviation between a time position of the synchronization signal and a time position of the reception slot of the subject CS, to thereby determine whether the synchronization state between another CS (determination request source) and the subject CS (determination request destination CS) is good or bad. The details of the determination processing will be described later. The synchronization state determination unit 108 transmits the determination result of the synchronization state to the wired communication unit 103, and the wired communication unit 103 transmits the synchronization state response signal including the determination result to another CS of the determination request source which is in the synchronization state.

The storage unit 109 is configured by, for example, a ROM (read only memory) or a RAM (random access memory), and stores a variety of information therein. For example, the storage unit 109 stores a CS candidate list together with information on priority order, as candidates of CSs that can be determination request destinations of the synchronization state.

Also, the storage unit 109 stores at least one of information on the transmission channel and the transmission slot of the synchronization signal of another CS within the network, or information on scheduled reception timing therein. The information on the transmission channel and the transmission slot of the synchronization signal is an example of the information on the time position to which the synchronization signal is transmitted. Also, the storage unit 109 stores, for example, information on the temporal deviation obtained by learning processing, or information on the correction parameter therein.

The learning processing unit 110 determines the correction parameter for correcting the communication timing according to the learning result while successively learning the temporal deviation between the subject CS and another CS in the asynchronous state. Accordingly, the learning processing unit 110 has a function as the correction parameter determination unit. The correction parameter is used in the undetected state.

The wireless communication determination unit 104, the communication timing determination unit 106, the communication timing correction unit 107, the synchronization state determination unit 108, and the learning processing unit 110 realize the respective functions by execution of a program stored in the storage unit 109.

Subsequently, a configuration example of the PSs 200 will be described.

Each of the PSs 200 includes, for example, a RAM, a ROM, and a CPU, and has the same function as a part of the function of the CS 100. For example, the PS 200 has the same functions as those of the wireless communication unit 101 and the synchronization state determination unit 108 of the CS 100.

Subsequently, a configuration example of a communication frame in the wireless communication unit will be described.

Figure 3:
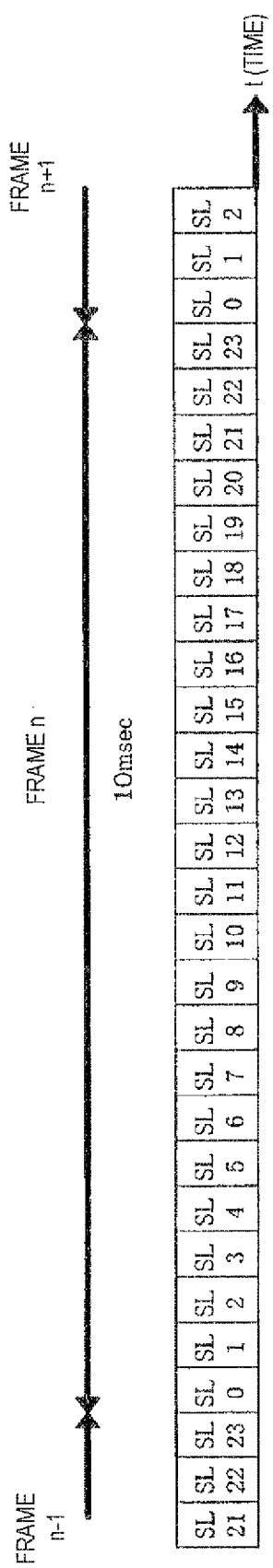
FIG. 3 is a diagram illustrating an example of a time-sharing system in a wireless communication according to the embodiment of the present invention.

The wireless communication unit in the communication system 1000 uses a time-sharing system in which one frame has 10 msec, and one frame is separated into 24 slots to conduct a communication, for example, as illustrated in FIG. 3. A communication of the time-sharing system includes, for example, a TDMA/TDD (time dimension multiple access/time division duplex) communication.

In an example illustrated in FIG. 3, one slot is configured by a time length obtained by equally dividing one frame (10 msec) into 24 pieces, and any slot is assigned to each communication device every time a communication starts to communicate with another communication device.

The synchronization signal is also called. "beacon signal", and includes synchronization data (for example, syncword). The syncword is predetermined known pattern data, which is a fixed digit sequence for timing synchronization, and becomes synchronization information for synchronizing the above-mentioned telephone (PS 200) and another slave CS with each other. In the DECT system, a specific syncword is assigned to each network, and the syncword is commonly included in signals transmitted by the respective terminals belonging to one network.

Subsequently, synchronization processing in a normal state of the CS 100 will be described.

Figure 4:
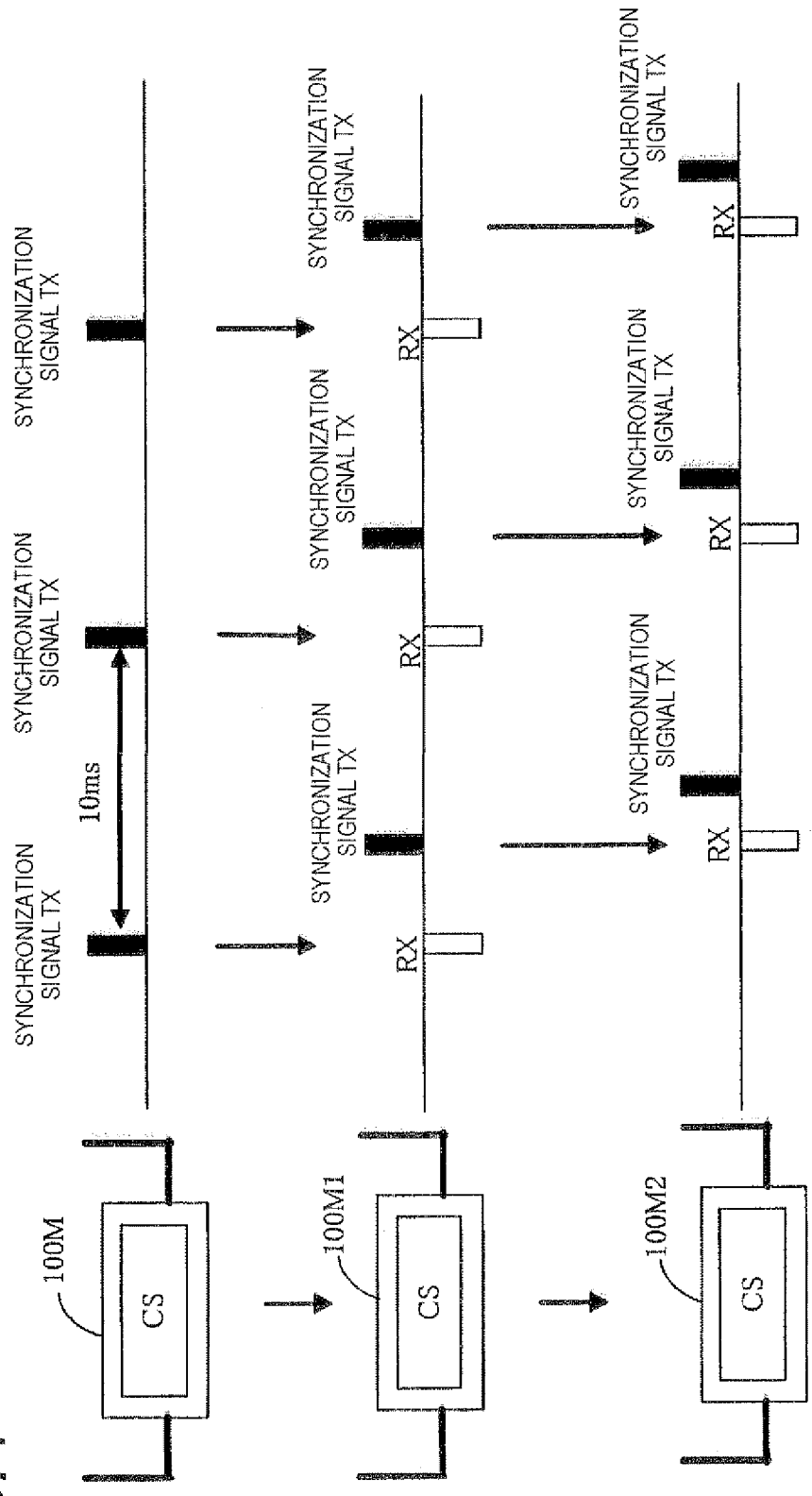
FIG. 4 is a diagram illustrating an example of a transmission/reception timing of a synchronization signal in a normal state of the base station apparatus according to the embodiment of the present invention.
Figure 5:
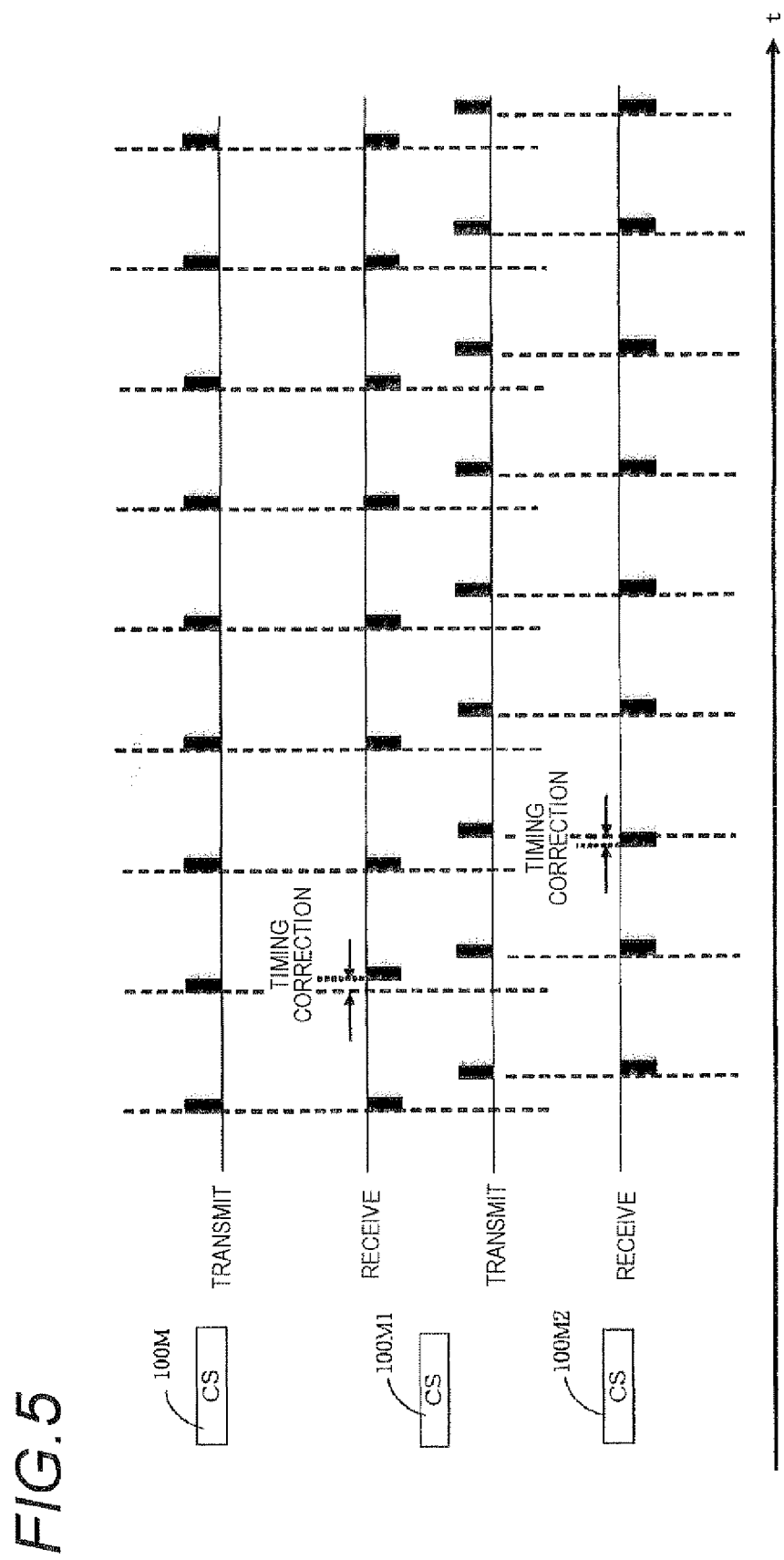
FIG. 5 is a diagram illustrating a correction example of communication timing in a normal state of the base station apparatus according to the embodiment of the present invention.

FIG. 4 is a diagram illustrating an example of the transmission/reception timing of the synchronization signal in the normal state of the CS 100. FIG. 5 is a diagram illustrating a correction example of the communication timing in the normal state of the CS 100.

The normal state is a state in which the synchronization signal is periodically received from a given CS 100, and synchronization can be conducted based on the synchronization signal. FIGS. 4 and 5 exemplify the synchronization processing among the CS 100M, the CS 100M1, and the CS 100M2. The CS 100M operates as a synchronization master of the CS 100M1, and the CS 100M1 operates as a synchronization master of the CS 100M2.

As illustrated in FIG. 4, the CS 100M transmits a synchronization signal (dummy) at a given interval (for example, slot 0 of a communication signal 30) (dummy TX).

Also, as illustrated in FIG. 4, the CS 100M1 which is the slave receives the synchronization signal from the CS 100M which is the master (RX), and operates in synchronization with the communication timing of the CS 100M. Also, the CS 100M1 transmits the synchronization signal of the CS 100M1 at a given interval (for example, slot 7 of the communication signal 30) (dummy TX).

The CS 100M2 receives the synchronization signal from the CS 100M1 (RX), and operates in synchronization with the communication timing of the CS 100M1. Also, the CS 100M2 transmits the synchronization signal of the CS 100M2 at a given interval (for example, slot 15 of the communication signal 30) (TX).

Also, as illustrated in FIG. 5, when the temporal deviation is generated between the CS 100M1 and the CS 100M, the CS 100M1 detects the temporal position of the syncword included in the synchronization signal, and immediately corrects the communication timing with the use of the detection result. FIG. 5 exemplifies a case in which the communication timing of the CS 100M1 is delayed from a given timing.

Also, when the temporal deviation is generated between the CS 100M2 and the CS 100M1, the CS 100M2 corrects the communication timing by the aid of the temporal deviation included in the synchronization signal. FIG. 5 exemplifies a case in which the communication timing of the CS 100M2 is advanced from the given timing.

The CS 100M1 and the CS 100M2 determine the correction parameter in the asynchronous time according to the information on the acquired temporal deviation, and hold the correction parameter in the storage unit 109.

According to the synchronization processing in the normal state, the communication timing in each CS 100 can be maintained at the given timing, and can be maintained in synchronization.

Subsequently, a description will be given of the synchronization processing in the undetected state of the CS 100.

Figure 6:
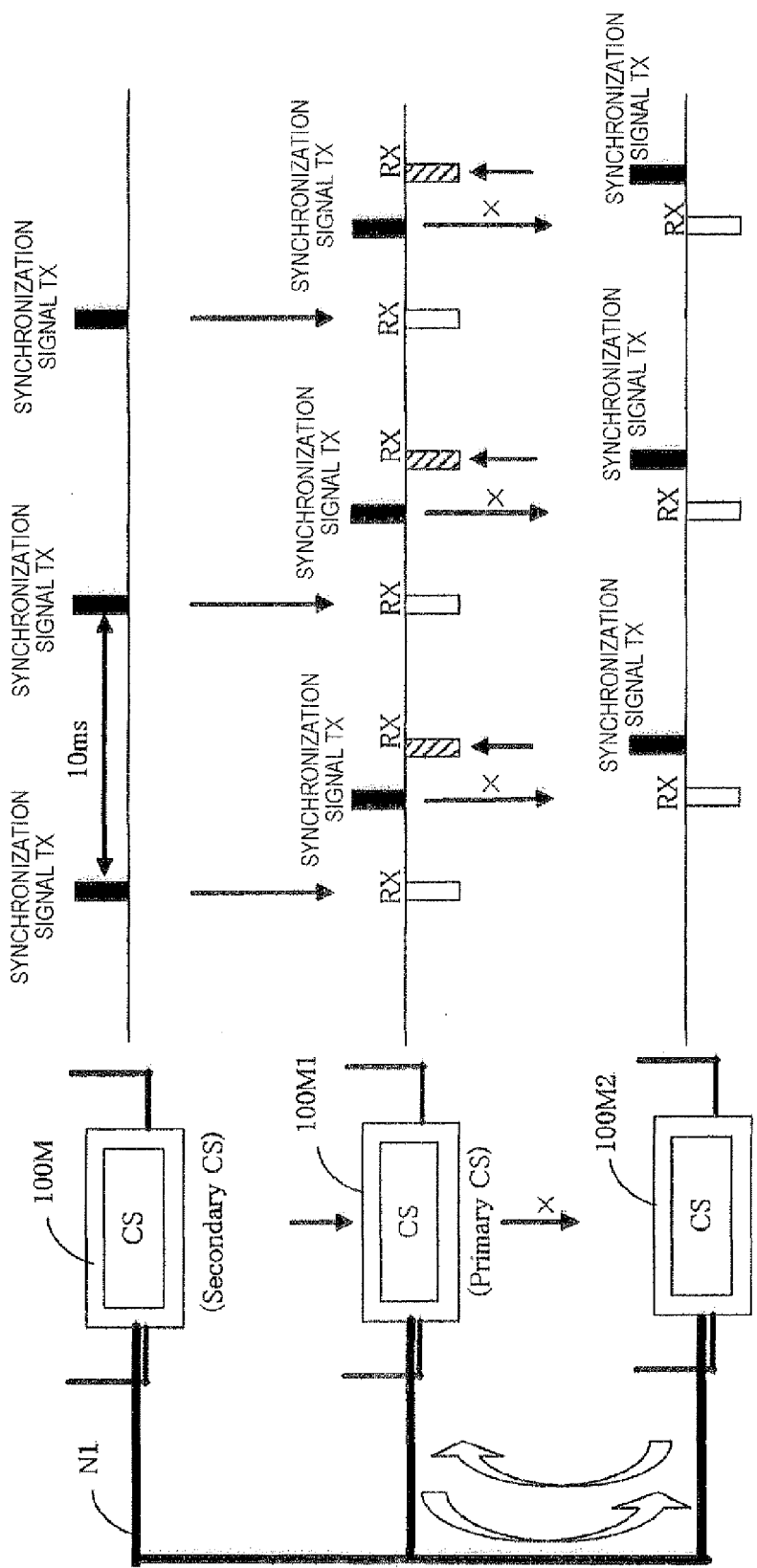
FIG. 6 is a diagram illustrating an example of the transmission/reception timing of the synchronization signal in a undetected state of the base station apparatus according to the embodiment of the present invention.

FIG. 6 is a diagram illustrating an example of the transmission/reception timing of the synchronization signal in the undetected state of the CS 100.

The CS 100M transmits the synchronization signal, for example, in the slot 0 of a frame n (TX). After the CS 100M transmits the synchronization signal in the slot 0 of the frame n, the CS 100M then transmits the synchronization signal in the slot 0 of a frame (n+1) after 10 msec, and thereafter transmits the synchronization signal in the slot 0 every 10 msec.

The CS 100M1 which is the slave receives the synchronization signal from the CS 100M (RX), and operates in synchronization with the communication timing of the CS 100M. The CS 100M1 also transmits the synchronization signal of the CS 100M1, for example, in the slot 7 at the given interval (every 10 msec) (TX). Under normal environments, the CS 100M2 that is the slave also receives the synchronization signal from the CS 100M1, and operates in synchronization with the communication timing of the CS 100M1.

In FIG. 6, the CS 100M2 cannot receive the synchronization signal for some cause, and is put in the undetected state. The CS 100M2 waits for the synchronization signal from the CS 100M1 until a given time is elapsed from the given timing, but cannot receive the synchronization signal. In this case, the CS 100M2 does not stop the operation even if the CS 100M2 cannot receive the synchronization signal, appropriately corrects the communication timing by the aid of the correction parameter acquired in learning in the normal time, and maintains the communicating timing with the CS 100M1.

Thus, even if the CS 100M2 fails to receive the synchronization signal from the CS 100M1, the CS 100M1 transmits the synchronization signal of the CS 100M2 at a given interval (for example, the slot 15 of the communication signal 30) (dummy TX). The CS 100M1 which is the master and the CS 100M which is the master higher in level than the CS 100M1 may receive the synchronization signal of the CS 100M2.

Also, if a state in which the CS 100M2 fails to receive the synchronization signal from the CS 100M1 is continued for a while (a given time or more), the CS 100M2 transmits the synchronization state confirmation signal requesting the determination of the synchronization state, through the wired network. The CS 100M1 or the CS 100M, which has received the synchronization state confirmation signal through the wired network, conducts determination processing by the synchronization state determination unit 108, and transmits the synchronization state response signal including the determination result (information on the temporal deviation) to the CS 100M2 of the determination request source. When the CS 100M2 acquires the information on the temporal deviation included in the synchronization state response signal through the wired network, the CS 100M2 corrects the communication timing with the use of the acquired temporal deviation. Thus, the CS 100M2 periodically transmits the synchronization state confirmation signal while the CS 100M2 cannot receive the synchronization signal, and corrects the communication timing with the use of the temporal deviation received through the wired network.

The CS 100M2 operates while correcting the communication timing by the aid of the information on the temporal deviation by periodically transmitting or receiving the synchronization state confirmation signal and the synchronization state response signal through the wired network, and attempts to receive the synchronization signal from the CS 100M1 by the wireless network in parallel. When the CS 100M2 receives the synchronization signal through the wireless network, the CS 100M2 returns to the normal state from the undetected state. When returning to the normal state, the CS 100M2 stops transmission and reception of the synchronization state confirmation signal and the synchronization state response signal. The CS 100M2 automatically returns to the normal state when the CS 100M2 could receive the synchronization signal while attempting to receive the synchronization signal, thereby being capable of preventing a network load on the wired network from being unnecessarily increased.

When the CS 100 fails to detect the synchronization signal of the CS 100 of the higher level, the CS 100 does not transmit the synchronization state confirmation signal immediately, but may conduct self-propulsion operation for a while (given period) while attempting to receive the synchronization signal from the CS 100M1 through the wireless network. The self-propulsion operation represents operation in the asynchronous state in which the CS 100 is not synchronized with another CS 100. For example, when the CS 100M1 fails to detect the synchronization signal of the high-level CS, the CS 100M1 shifts to the self-propulsion operation, corrects the communication timing based on the correction parameter stored in the storage unit 109 during the self-propulsion operation, and attempts to maintain the communication timing.

Subsequently, the determination processing of the synchronization state (timing deviation) will be described.

Figure 7:
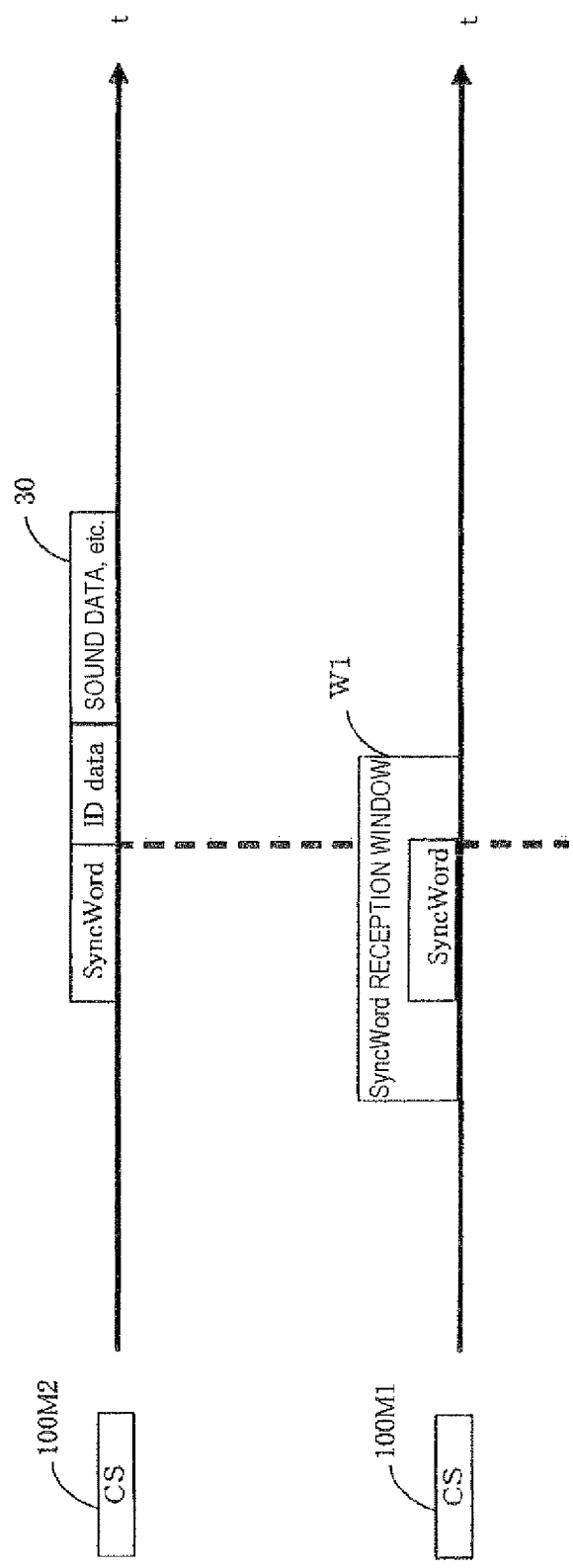
FIG. 7 is a diagram illustrating an example of determination processing in a synchronization state according to the embodiment of the present invention.
Figure 8:
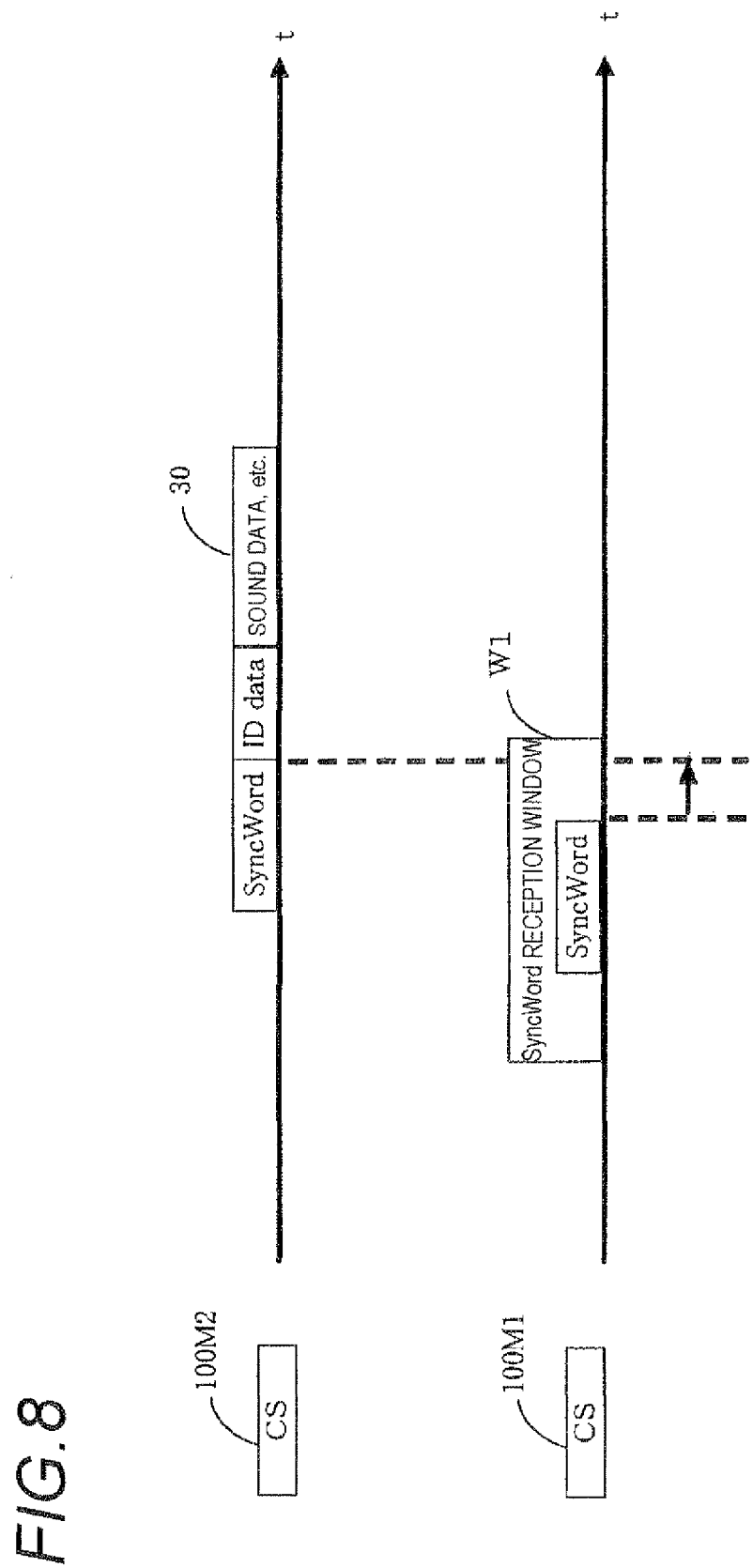
FIG. 8 is a diagram illustrating an example of the determination processing in the synchronization state according to the embodiment of the present invention.
Figure 9:
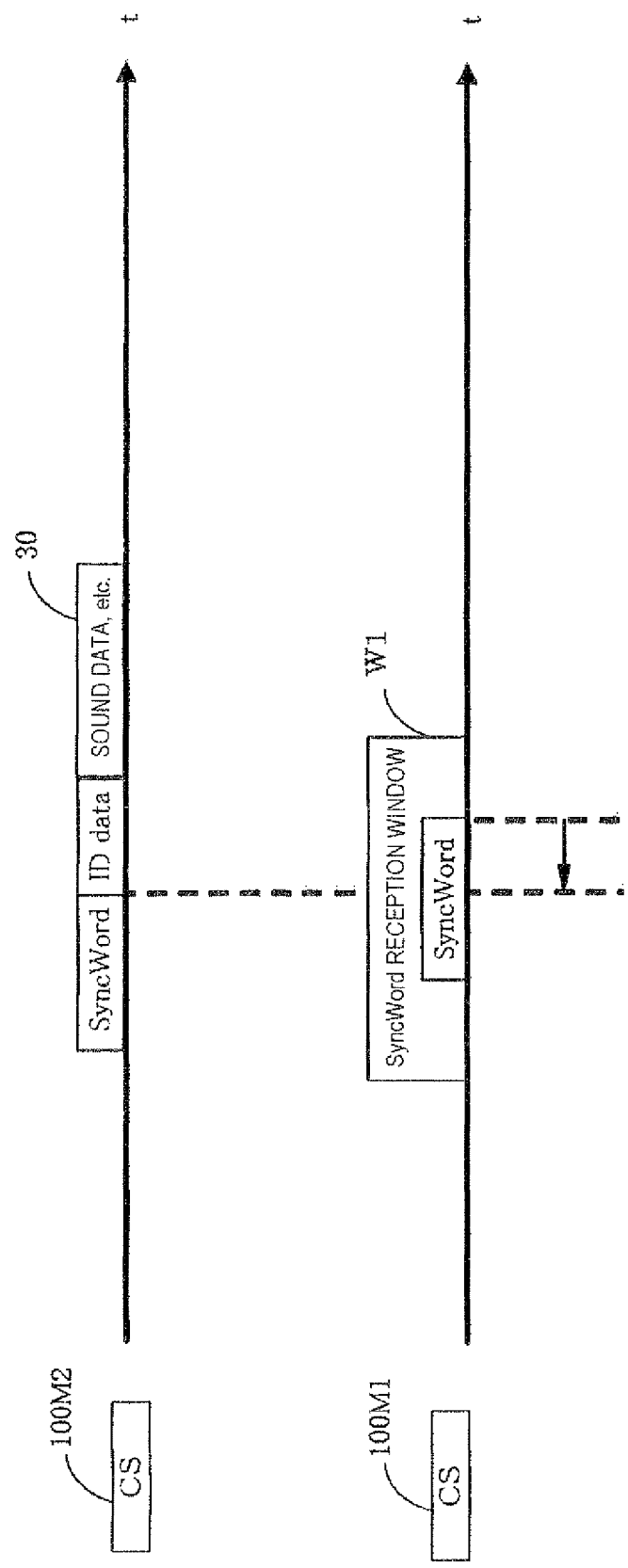
FIG. 9 is a diagram illustrating an example of the determination processing in the synchronization state according to the embodiment of the present invention.

FIGS. 7 to 9 are diagrams illustrating the determination processing of the synchronization state. FIGS. 7 to 9 exemplify that the CS 100M1 is the synthronization master of the CS 100M2, and the CS 100M2 may be in the normal state, or in the undetected state. Also, in FIGS. 7 to 9, the wireless communication unit 101 of the CS 100M2 transmits the communication signal by the aid of the assigned slots.

The communication signal 30 of the CS 100M2 includes, for example, "syncword", "ID data", and "sound data". "ID data" indicates identification information on the source of the communication signal 30. "ID data" may be omitted. If "ID data" is included in the communication signal 30, the determination request source of the synchronization state can be surely identified. If "ID data" is included in the communication signal 30, since the synchronization state is determined after ID check has been implemented, a difference is generated in the determination time of the synchronization state, and an influence of jamming can be reduced. Also, the CS 100M1 may determine the synchronization state only when "ID data" included in the synchronization signal of the CS 100M2 is valid.

In the CS 100M1, the synchronization state determination unit 108 sets a reception window W1 for receiving "syncword" of the synchronization signal from the CS 100M2. The reception window W1 is set to a time interval having ±2 bits of the scheduled reception timing of "syncword". ±2 bits is exemplary, and the time interval may be longer or shorter than ±2 bits. The reception window W1 illustrated in FIGS. 7 to 9 is an example of the scheduled reception timing of the synchronization signal (for example, synchronization information).

The scheduled reception timing can be predicted based on the slot information scheduled for the CS 100M2 to transmit the synchronization signal. That is, the CS 100M1 conducts the receiving operation according to the slot scheduled to transmit the synchronization signal known previously, and detects the temporal deviation (before and after) between the reception window W1 and the "syncword" actually received. The CS 100M1 may store the information on the transmission channel and the transmission slot of the synchronization signal from the CS 100M2, or the information on the scheduled reception timing in advance.

As illustrated in FIG. 7, when the reception timing of the syncword is substantially in the center of the reception window W1, the synchronization state determination unit 108 of the CS 100M1 is synchronized with the CS 100M1 and the CS 100M2, and determines that there is no temporal deviation.

Also, as illustrated in FIG. 8, when the reception timing of the syncword is temporally at the rear end of the center of the reception window W1, the synchronization state determination unit 108 of the CS 100M1 determines that the communication timing of the CS 100M2 is delayed more than that of the CS 100M1.

Also, as illustrated in FIG. 9, when the reception timing of the syncword is temporally in front of the center of the reception window W1, the synchronization state determination unit 108 of the CS 100M1 determines that the communication timing of the CS 100M2 is advanced more than that of the CS 100M1.

Thus, the synchronization state determination unit 108 may determine the synchronization state based on a difference between the reception timing of the synchronization information included in the synchronization signal, and the scheduled reception timing of the synchronization information. As a result, the synchronization state determination unit 108 can determine the synchronization state with high precision.

When the determination request source of the synchronization state is the CS 100M2, the CS 100 that determines the synchronization state may be, for example, the CS 100M.

Subsequently, an operation example of the CS 100 in the normal state will be described.

Figure 10:
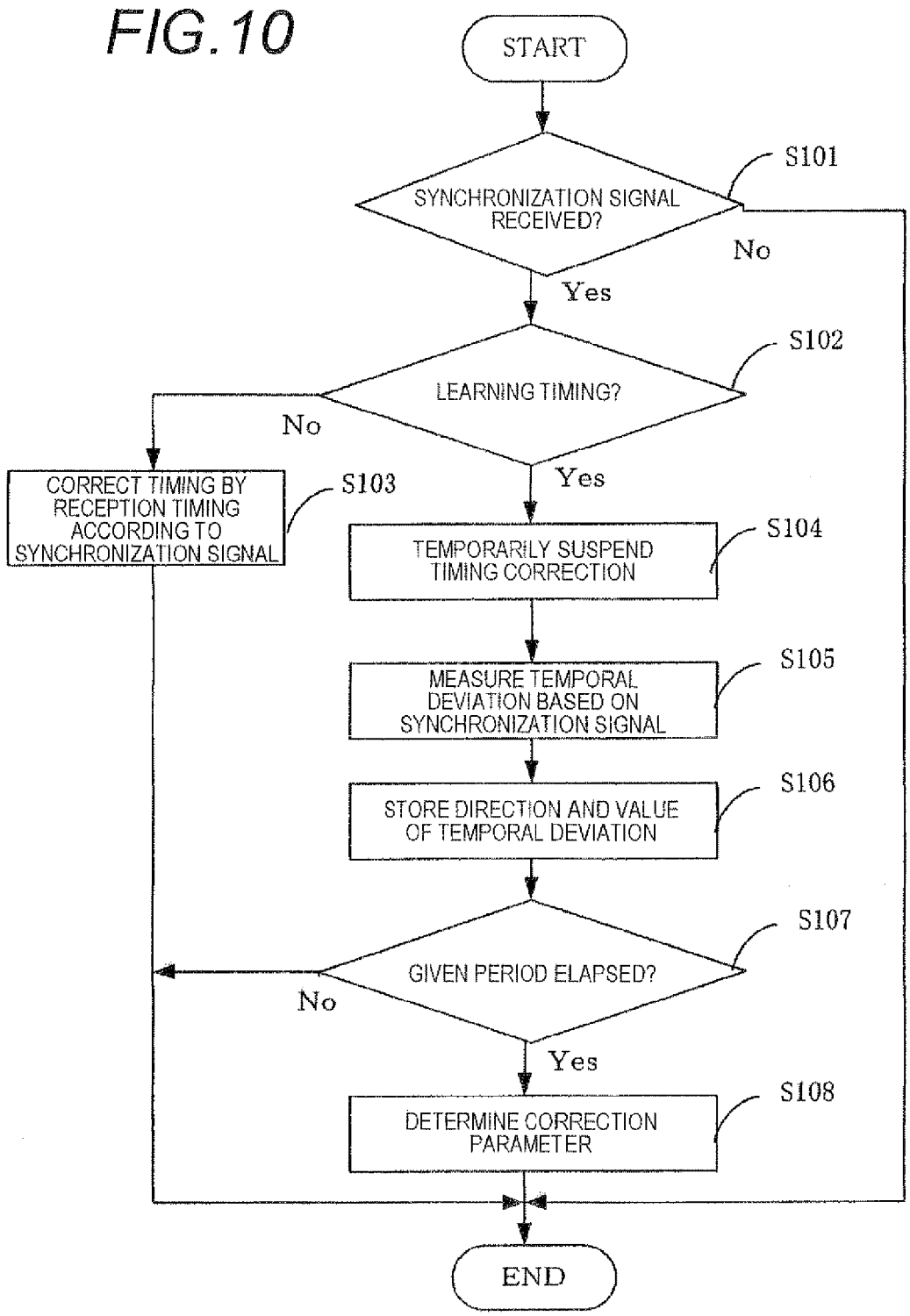
FIG. 10 is a flowchart illustrating an operation example of the normal state of the base station apparatus according to the embodiment of the present invention.

FIG. 10 is a flowchart illustrating an operation example of the CS 100 in the normal state.

The CS 100 conducts the learning processing in the normal state, and maintains the communication timing by the aid of the result of the learning processing when shifting to the undetected state. FIG. 10 exemplifies that the CS 100M2 which is the slave is synchronized with the synchronization signal from the CS 100M1 which is the master.

First, the wireless communication determination unit 104 determines whether the synchronization signal from the CS 100M1 is received at a given timing by the wireless communication unit 101, or not (Step S101). The given timing represents timing scheduled to receive the synchronization signal from the CS 100M1.

When the synchronization signal is not received at the given timing, the CS 100M2 terminates the processing of FIG. 10 (undetected state).

Subsequently, the learning processing unit 110 determines whether the synchronization signal is learning timing for the CS 100 to learn, or not, with reference to a timer (Step S102). If the synchronization signal is not the learning timing, the communication timing correction unit 107 corrects the communication timing based on the synchronization signal received by the wireless communication unit 101 (Step S103). For example, learning for 10 seconds every 1 minute is determined in advance. In the processing of FIG. 10, a timer (for example, RTC (real time clock)) not shown of the CS 100 counts time.

On the other hand, the synchronization signal is received at the given timing, and if the time is the learning timing (yes in Step S102), the flow proceeds to Step S104 as it is.

In the learning timing, the communication timing correction unit 107 temporarily interrupts the correction after the communication timing has been corrected, for example, once (Step S104). That is, the CS 100M2 intentionally generates the asynchronous state (self-propulsion state).

Subsequently, the learning processing unit 110 measures the temporal deviation from the CS 100M1 (Step S105). For example, the learning processing unit 110 measures the temporal deviation between the reception timing of the synchronization signal from the CS 100M1 and the scheduled reception timing of the synchronization signal from the CS 100M1.

The information on the measured temporal deviation includes the direction of the temporal deviation and the degree of the temporal deviation (a value of the temporal deviation) of the communication timing of the CS 100M2 to the CS 100M1. The direction of the deviation indicates whether the communication timing of the CS 100M2 is advanced (−) or delayed (+) with respect to the communication timing of the CS 100M1. The value of the temporal deviation indicates the size of the deviation of the communication timing between the CS 100M1 and the CS 100M2, and is represented by, for example, the number of bits or time. Accordingly, information on the temporal deviation may be represented by +1 bit or −1 bit.

The detection precision of the temporal deviation is, for example, $\frac{1}{12}$ (bits). 1 bit is, for example, 868 nanoseconds. The value of the temporal deviation may be information on the specific number of seconds.

Subsequently, the learning processing unit 110 saves the information on the measured temporal deviation in the storage unit 109 (Step S106).

Subsequently, the learning processing unit 110 determines whether the learning timing has been terminated, or not, with reference to the timer (Step S107). For example, the learning processing unit 110 determines whether 10 seconds have been elapsed from a start time point of the learning timing, or not. If the learning timing has not been terminated, the flow returns to the processing of Step S105.

Subsequently, the learning processing unit 110 determines whether the learning timing has been terminated, or not, with reference to the timer (Step S107). For example, the learning processing unit 110 determines whether 10 seconds have been elapsed from the start time point of the learning timing, or not. If the learning timing has not been terminated, the flow returns to the processing of Step S105.

On the other hand, if the learning timing has been terminated, the learning processing unit 110 determines the correction parameter of the communication timing in the self-propulsion state, based on the information on the temporal deviation saved in the storage unit 109 at the learning timing. The correction parameter is, for example, −1 bit when the information on the temporal deviation is +1 bit, and +1 bit when the information on the temporal deviation is −1 bit.

Figure 11:
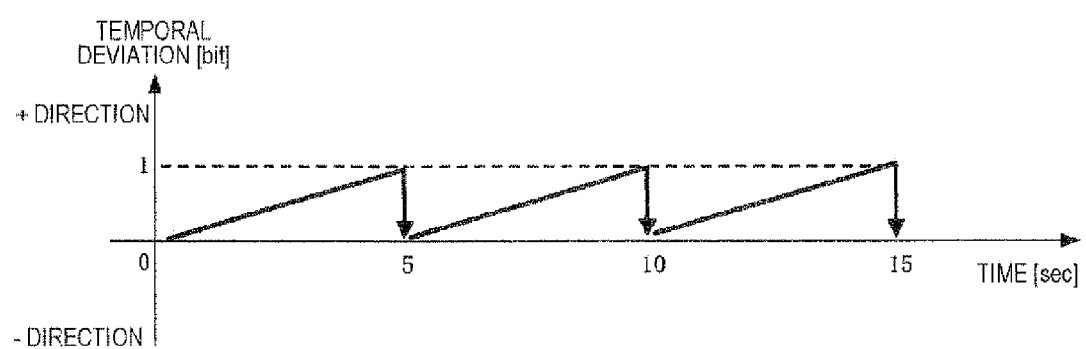
FIG. 11 is a flowchart illustrating a correction example of a communication timing using a correction parameter by the base station apparatus according to the embodiment of the present invention.

FIG. 11 illustrates an example in which the CS 100M2 corrects the communication timing by the aid of a correction parameter through the communication timing correction unit 107. FIG. 11 illustrates that the temporal deviation is generated by +1 bit per 5 seconds in the self-propulsion state. In this case, the correction parameter is −1 bit (−1 bit/5 sec) per 5 seconds.

Thus, the CS 100M2 determines the correction parameter by learning of the learning processing unit 110 to correct the communication timing according to the tendency of the temporal deviation of the CS 100 in the self-propulsion state. Accordingly, the CS 100 can stably maintain the communication timing even if the CS 100 lapses into the undetected state.

Figure 12:
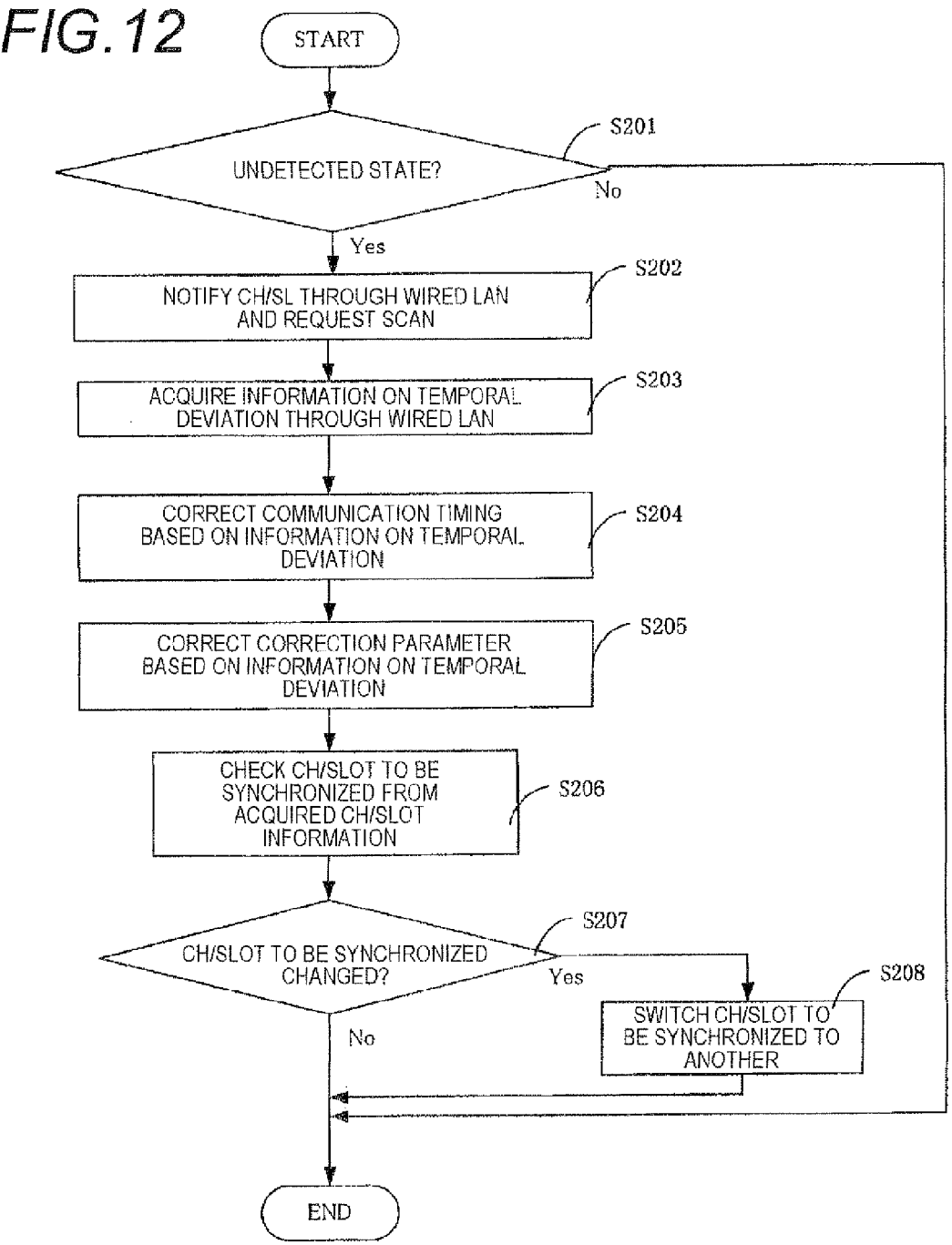
FIG. 12 is a flowchart illustrating an operation example in the undetected state of the base station apparatus according to the embodiment of the present invention.
Figure 13:
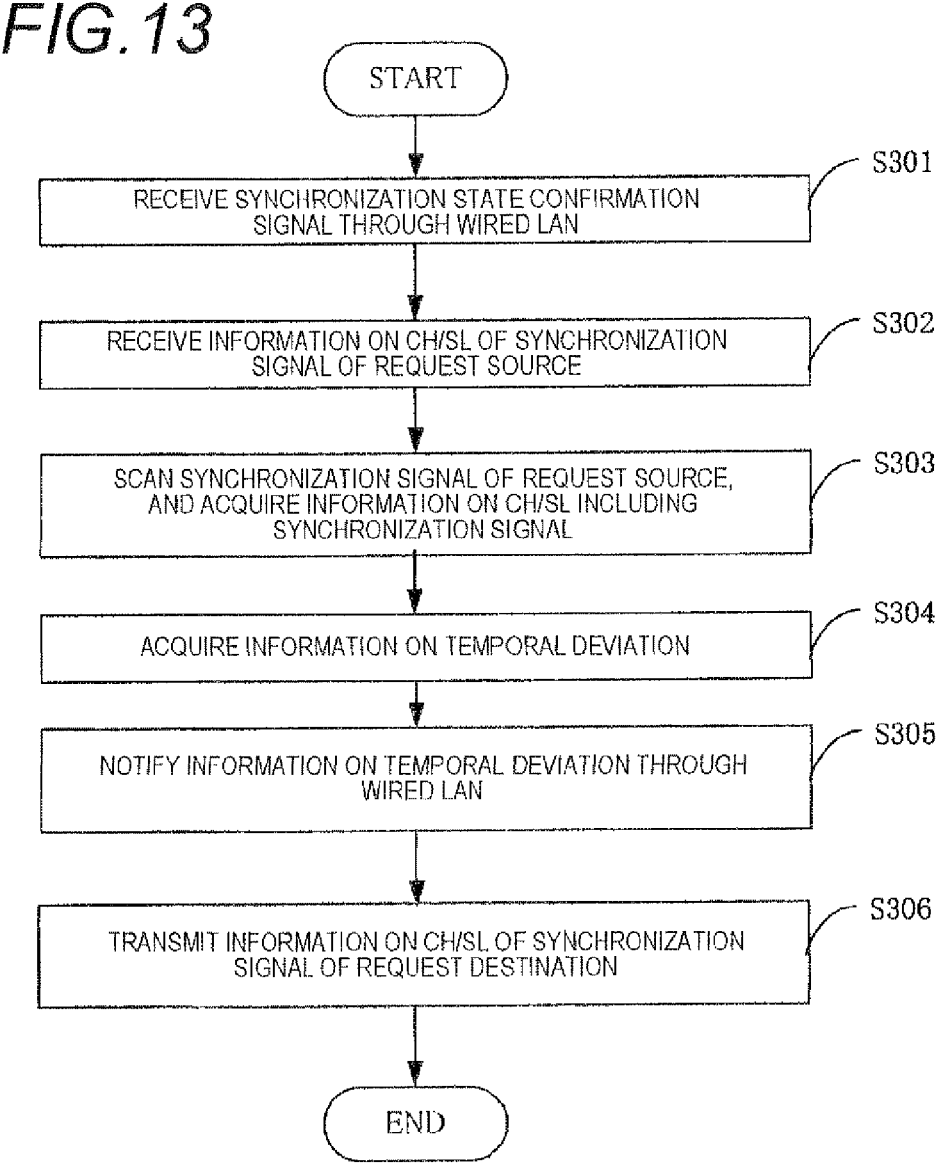
FIG. 13 is a flowchart illustrating an operation example when determining the synchronization state of the base station apparatus according to the embodiment of the present invention.

FIG. 12 is a flowchart illustrating an operation example of the CS 100M1 in the undetected state. FIG. 13 is a flowchart illustrating an operation example of the CS 100M that determines the synchronization state. Subsequently, a description will be given of an operation example of the CS 100 in the undetected state based on the flowcharts of FIGS. 12 and 13. In this example, the CS 100 that is in the undetected state is regarded as the CS 100M1, and the CS 100 that determines the synchronization state with the CS 100M1 upon receiving a determination request of the synchronization state from the CS 100M1 is regarded as the CS 100M. In the processing of FIGS. 12 and 13, a tinier (for example, RTC (real time clock) not shown of the CS 100 counts time.

In the examples of FIGS. 12 and 13, the CS 100M1 fails to detect the synchronization signal from the CS 100M, and inquires of the CS 100M through the wired network for the degree of temporal deviation of the CS 100M1. The inquired CS 100M receives the synchronization signal of the CS 100M1 which is the inquiry source, acquires the information on the temporal deviation, and notifies the CS 100M1 of the information on the temporal deviation. The CS 100M1 corrects the communication timing based on the information on the notified temporal deviation. In the undetected state, the CS 100M1 corrects the communication timing by the correction parameter determined by the learning processing.

Hereinafter, the flowchart of FIG. 12 will be described in detail. First, the wireless communication determination unit 104 of the CS 100M1 determines whether the CS 100M1 is in the undetected state, or not (Step S201). For example, the wireless communication determination unit 104 determines whether the CS 100M1 receives the synchronization signal from the CS 100M for a given period or more, or not. If the CS 100M1 is not in the undetected state, the flow is terminated without conducting the following processing.

When the CS 100M1 is in the undetected state, the wired communication unit 103 transmits the synchronization state confirmation signal indicating a request for determination of the synchronization state through the wired network as described above.

In this situation, the synchronization state confirmation signal is transmitted with the inclusion of information on a channel (CH) and a slot (SL) for transmitting the synchronization signal of the CS 100M1 to request scan by the CH and the SL (Step S202). Another CS (for example, CS 100M) that has received the synchronization state confirmation signal through the wired network receives the synchronization signal of the CS 100M1 of the determination request source, and conducts the determination processing. The synchronization state response signal including the information on the temporal deviation is transmitted to the CS 100M1 through the wired network. The information on the channel and the slot for transmitting the synchronization signal of the CS 100M1 of the determination request source may be included in the synchronization state confirmation signal for transmission, or may be included in another communication signal for transmission.

Subsequently, the wired communication unit 103 of the CS 100M1 receives the synchronization state response signal returned from another CS (for example, CS 100M), and acquires the information on the temporal deviation (Step S203). The information on the temporal deviation includes the direction of the temporal deviation and the value of the temporal deviation of the CS 100M1 relative to the CS 100M. Also, the synchronization state response signal returned from the CS 100M of the determination request destination also includes the information on the channel and the slot for allowing the CS 100M to transmit the synchronization signal. The wired communication unit 103 of the CS 100M1 receives the information on the transmission channel and the transmission slot of the synchronization signal of the CS 100M, which is transmitted from the CS 100M through the wired network.

Then, the communication timing correction unit 107 corrects the communication timing based on the information on the temporal deviation from the CS 100M (Step S204). The processing of Steps S202 to S205 corresponds to the network correction.

Then, the communication timing correction unit 107 corrects (adjusts) the correction parameter stored in the storage unit 109, based on the information on the temporal deviation from the CS 100M (Step S205).

Then, the communication timing correction unit 107 checks whether to match the transmission channel and the transmission slot to be synchronized, or not, based on the information on the transmission channel and the transmission slot of the synchronization signal of the received CS 100M, and confirms whether the transmission slot and the transmission channel which establish the synchronization are correct, or not (Step S206).

Subsequently, as a result of checking the information on the transmission channel and the transmission slot to be synchronized, the communication timing correction unit 107 determines whether the transmission channel and the transmission slot to be synchronized are to be changed, or not (Step S207). The information on the transmission channel and the transmission slot for allowing the CS to be synchronized to transmit the synchronization signal is stored in the storage unit 109. For example, if the CS is to be synchronized with the synchronization signal of the CS 100M, the communication timing correction unit 107 determines that the transmission channel and the transmission slot to be synchronized are changed if the transmission channel and the transmission slot of the acquired synchronization signal are different from the information on the transmission channel and the transmission slot stored in the storage unit 109. Also, the communication timing correction unit 107 determines that there is no change if the transmission channel and the transmission slot of the acquired synchronization signal are the same as the information on the transmission channel and the transmission slot stored in the storage unit 109.

If it is determined that the information on the transmission channel and the transmission slot is changed, the communication timing correction unit 107 switches the transmission channel and the transmission slot to be synchronized to others (Step S208). The communication timing correction unit 107 saves the information on the switched transmission channel and transmission slot in the storage unit 109.

With the processing of FIG. 12, the determination of the correction parameter in the learning processing can be corrected. The accuracy of the correction parameter in the learning processing may be insufficient. The correction parameter in the learning processing is corrected based on the information on the temporal deviation from the CS 100M to obtain the correction parameter with high precision.

Subsequently, a flow will be described with reference to FIG. 13.

The wired communication unit 103 of the CS (for example, CS 100M) of the determination request destination receives the synchronization state confirmation signal from the CS 100M1 of the determination request source which is in the undetected state (Step S301). Also, the wired communication unit 103 of the CS 100M of the determination request destination receives the information on the transmission channel and the transmission slot of the synchronization signal of the CS 100M1 from the CS 100M1 (Step S302). The information on the transmission channel and the transmission slot of the synchronization signal of the CS 100M1 from the CS 100M1 may be included in the synchronization state confirmation signal for transmission, or may be included in another communication signal for transmission. Also, when the information on the transmission channel and the transmission slot of the synchronization signal of the CS 100M1 is stored in the storage unit 109 in advance, the transmission and reception may be omitted.

Subsequently, the synchronization state determination unit 108 of the CS 100M of the determination request destination scans the synchronization signal generated by the CS 100M1 of the determination request source through the wireless communication unit 101, and acquires the information on the channel and the slot included in the synchronization signal (Step S303).

Subsequently, the synchronization state determination unit 108 of the CS 100M of the determination request destination scans the synchronization signal generated by the CS 100M1 of the determination request source based on the channel and the slot received by the wired communication unit 103. The synchronization state determination unit 108 measures the temporal deviation between the reception timing of the synchronization signal that could be received by scanning, and the scheduled reception timing of the synchronization signal from the CS 100M1, to thereby determine the synchronization signal between the CS 100M and the CS 100M1. For example, the synchronization state determination unit 108 determines the synchronization state based on the temporal difference between the reception timing of the synchronization state that could be received from the CS 100M1, and the scheduled reception timing. With the determination of the synchronization state, the synchronization state determination unit 108 acquires the information on the temporal deviation of the CS 100M1 relative to the CS 100M (Step S304).

Subsequently, the wired communication unit 103 of the CS of the determination request destination transmits the information on the temporal deviation acquired from the synchronization state determination unit 108 to the CS 100M1 through the wired network (Step S305). Also, the wired communication unit 103 of the CS 100M of the determination request destination also includes the information on the transmission channel and the transmission slot of the synchronization signal to be transmitted by the CS 100M per se in the synchronization state response signal, and transmits the information to the CS 100M1 (Step S306).

Thus, with the processing of FIG. 13, the CS 100M of the determination request destination can give notice of the information on the temporal deviation between the request source and the request destination through the wired network in response to the determination request of the synchronization state from the CS 100M1 which is the request source. Since the CS 100M1 is in the undetected state, a credibility of the wireless network is low. However, the CS 100M can surely give notice of the information on the temporal deviation by the aid of the wired network.

Figure 14:
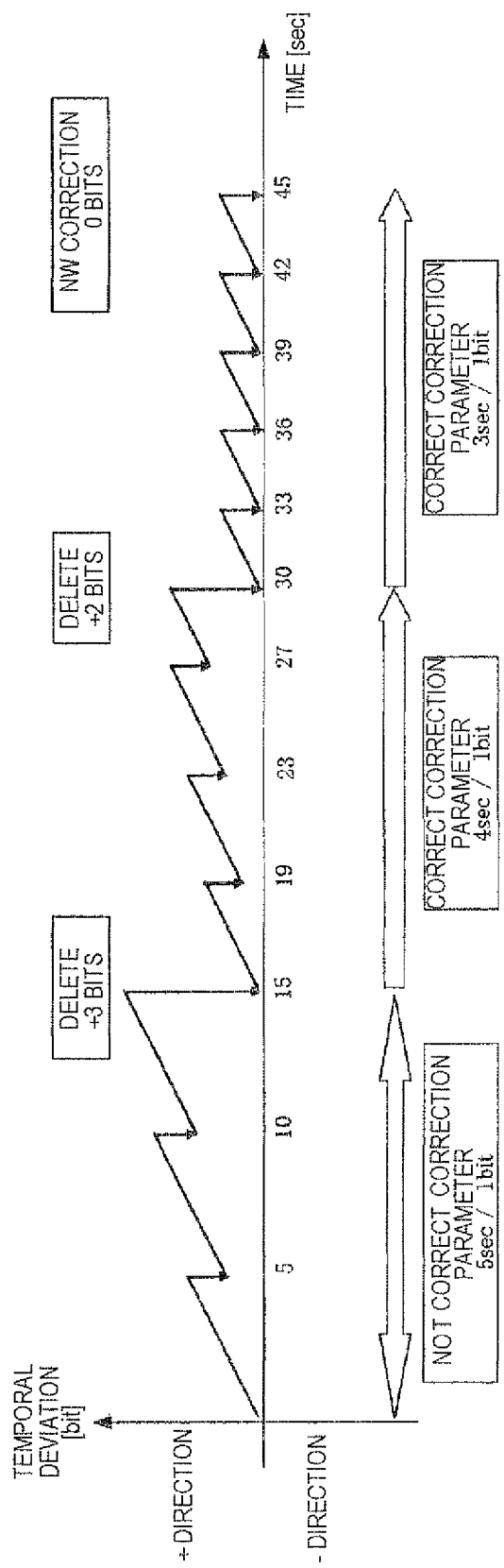
FIG. 14 is a diagram illustrating a correction example of communication timing and a correction parameter by the correction parameter and the network correction in the base station apparatus according to the embodiment of the present invention.

FIG. 14 illustrates an example in which when the temporal deviation is generated in the CS 100M1, the CS 100M1 of the determination request source corrects the communication timing by the correction parameter and the network correction to correct the correction parameter.

In the example of FIG. 14, the correction parameter determined by the learning processing in the normal state is −1 bit per 5 seconds (−1 bit/5 sec). While the network correction is not conducted, the correction parameter is merely corrected by −1 bit per 5 seconds, and the temporal deviation becomes gradually increased.

When it is assumed that an initial time point having no temporal deviation is 0 seconds, the network correction is conducted every 15 seconds in the example of FIG. 14. When the information on the temporal deviation is acquired from the CS 100M by the network correction, in order to remove +3 bits at a time point of 15 seconds, notice is given to conduct −3 bits correction. However, because the correction parameter determined: by the above-mentioned learning processing is −1 bit per 5 seconds, both of the correction values are added in the communication timing correction unit 107 to correct −4 bits at the time point of 15 seconds. Also, at the time point of 15 seconds, the communication timing correction unit 107 corrects, for example, the correction parameter to −1 bit (−1 bit/4 sec) per 4 seconds. The above change in the correction parameter makes a range of the temporal deviation smaller.

At a subsequent time point of 30 seconds, notice is given to conduct −2 bit correction in order to remove +2 bits from the CS 100M by the network correction. Similarly, in this case, because the correction parameter determined by the above-mentioned learning processing is −1 bit per 5 seconds, both of the correction values are added in the communication timing correction unit 107 to conduct the correction of −3 bits at the time point of 30 seconds. Also, at the same time point, the communication timing correction unit 107 corrects, for example, the correction parameter to −1 bit (−1 bit/3 sec) per 3 seconds. As a result, the temporal deviation becomes substantially 0 every 3 seconds, and the network correction (NW correction) becomes 0 bits also at a time point of 45 seconds.

Thus, whether the correction parameter determined by the learning processing is an appropriate parameter, or not, can be evaluated by measuring the temporal deviation between the reception timing of the synchronization signal that can be received by the synchronization signal scan in the determination request destination CS 100M, and the scheduled reception timing. Since the evaluation result (information on the temporal deviation) by the CS 100M is notified the CS 100M1 of the determination request source of, the CS 100M1 can improve the communication timing and the correction parameter.

Subsequently, the priority order of the determination request destinations which are in the synchronization state will be described.

Figure 15:
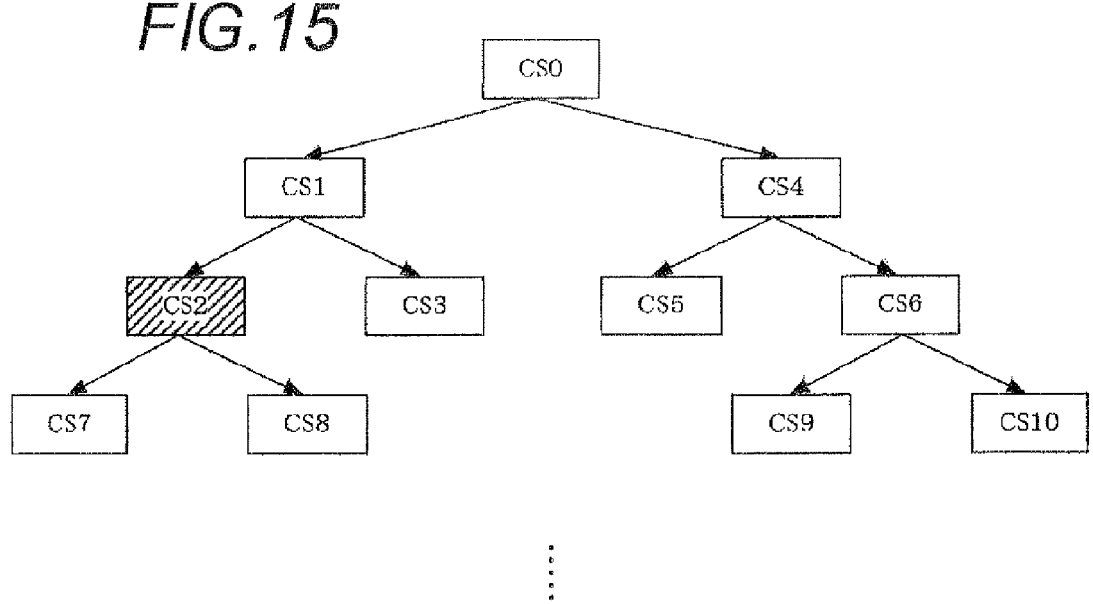
FIG. 15 is a diagram illustrating an example of a hierarchical structure of a plurality of base station apparatuses according to the embodiment of the present invention.

FIG. 15 is a diagram illustrating an example of a hierarchical structure of the plurality of CSs in the communication system 1000. In FIG. 15, it is assumed that the CS2 among the plurality of CSs (CS0 to CS10) becomes in the undetected state.

The CS2 is synchronized with the synchronization signal from the CS1 arranged in the hierarchy of one higher level in the normal state.

When the CS2 fails to detect the synchronization signal from the CS1, the CS2 requests the CS 100 of the higher level hierarchy than that of the CS2 to determine the synchronization state. Therefore, the determination request destination, which is in the synchronization state, of the CS2 is any one of CS0, CS1, and CS4. Because the CS 100 of the lower level hierarchy than that of the CS2 is a device basically synchronized with the synchronization signal of the C52, the CS 100 is lower in the priority order as the determination request destination which is in the synchronization state.

Also, the CS2 may request the CS 100 of the same hierarchy as that of the CS2 to determine the synchronization state. As a result, options of the determination request destinations which are in the synchronization state are increased, and a possibility that the information on the temporal deviation can be obtained is increased.

Also, in the CS2, the storage unit 109 may hold the information on the priority order of the determination request destinations which are in the synchronization state as the CS candidate list in advance. In this case, the wired communication unit 103 determines the destination of the synchronization state confirmation signal based on the CS candidate list.

For example, the priority order of the determination request destinations which are in the synchronization state by the CS2 are CS1, CS4, CS5, CS6, and CS3 in descending order. The reason that the priority of CS3 is lowest is because when the synchronization signal of the CS1 highest in the priority is undetected, there is a possibility that the power supply of, for example, the CS1 is off, or the wireless environments are poor, and a possibility that the synchronization signal of the CS3 cannot be confirmed is high. With the use of the information on the priority order, the synchronization state can be confirmed in order intended in advance.

Further, when the synchronization state response signal is not obtained even if the CS2 requests the determination of the synchronization state till a CS of a given order, the CS may broadcast the determination request of the synchronization state to another CS that has not yet requested the determination of the synchronization state. As a result, the CS can early find out the CS 100 that can determine the synchronization state, and can early maintain the communication timing.

Subsequently, a description will be given of a case in which the CS 100 requests the PS 200 to determine the synchronization state.

FIG. 16 is a diagram illustrating the transmission/reception timing of the synchronization signal in the undetected state of the CS 100M2, and the reception timing of the synchronization signal of the PS 200.

For example, when the CS 100M2 cannot confirm the synchronization state confirmation signal from the CS 100M1 by the wired communication unit in the undetected state, the CS 100M2 may request the determination of the synchronization state through the PS 200. As a result, the possibility that the synchronization state can be determined becomes high.

First, the wireless communication unit 101 of the CS 100M2 requests the PS 200 to determine the synchronization state. That is, the CS 100M2 transmits the synchronization state confirmation signal for synchronization state confirmation to the PS 200. For example, the determination request of the synchronization state includes the information on at least one of the transmission channel and the transmission slot of the synchronization signal of the CS 100M2, and the information on at least one of the transmission channel and the transmission slot of the synchronization signal of the CS 100M1 as the synchronization master therein. The information on at least one of the transmission channel and the transmission slot of the synchronization signal of the CS 100M1 is stored in the storage unit 109 by the CS 100M1 in advance. The wired network is not used for the determination request of the synchronization state.

Subsequently, the PS 200 receives the determination request of the synchronization state through the wireless network, and acquires the information on the transmission channels and the transmission slots of the synchronization signals of the CS 100M2 of the request source and the CS 100M1 of the request destination. The PS 200 may inquire of the CS 100M1 about the information on the transmission channel and the transmission slot of the synchronization signal of the CS 100M1.

Subsequently, the PS 200 sets the respective reception windows, for example, based on the information on the acquired respective transmission channels and transmission slots. The PS 200 receives the synchronization signals of the CS 100M1 and the CS 100M2 through the wireless network.

The PS 200 determines the synchronization state between the CS 100M1 and the CS 100M based on the receive positions of the synchronization signal in the respective reception windows. The PS 200 notifies the CS 100M1 of the information on the temporal deviation including the determination result of the synchronization state through the wireless network. The signal including the information on the temporal deviation transmitted by the PS 200 is an example of the synchronization state response signal.

Therefore, the CS 100M1 acquires the information on the temporal deviation from the PS 200 to confirm the synchronization state with another CS 100 even if the CS 100M1 cannot use the wired network between the CS 100M1 and another CS 100 (for example, CS 100M).

As illustrated in FIGS. 7 to 9, the ID of the CS 100 is included in the communication frame of the synchronization signal together with the syncword whereby the PS 200 can identify the source of the synchronization signal with high precision. Accordingly, a determination precision of the synchronization state by the PS 200 can be improved.

The present invention is not limited to the configuration of the above embodiment, but can be applied to any configurations that can achieve the functions defined by the claims, or the functions provided by the configuration of this embodiment.

There is provided a base station apparatus that communicates with another base station apparatus by a time-sharing system, the base station apparatus including; a wireless communication unit that communicates with the another base station apparatus through a wireless network; a wired communication unit that communicates with the another base station apparatus through a wired network; a communication timing determination unit that determines a communication timing of a communication signal communicated by the wireless communication unit; and a communication timing correction unit that corrects the communication timing determined by the communication timing determination unit, wherein if the wireless communication unit fails to receive a synchronization signal from the another base station apparatus at given reception timing, the wired communication unit transmits a synchronization state confirmation signal for confirming a synchronization state between the base station apparatus and the another base station apparatus, and receives a synchronization state response signal including a determination result of the synchronization state, and the communication timing correction unit corrects the communication timing based on the synchronization state response signal received by the wired communication unit.

According to this configuration, even if the base station apparatus fails to detect the synchronization signal transmitted through the wireless network, the base station apparatus requests another base station apparatus to determine the synchronization state through the wired network, and can acquire the determination result of the synchronization state. Accordingly, even if the base station apparatus fails to receive the given synchronization signal, the plurality of base stations can be synchronized with each other with high precision.

The base station apparatus may be configured so that if the wireless communication unit fails to receive the synchronization signal from a first base station apparatus at a given reception timing, the wired communication unit transmits the synchronization state confirmation signal to the first base station apparatus, and receives the synchronization state response signal from the first base station apparatus.

According to this configuration, even if the base station apparatus fails to detect the synchronization signal transmitted from the first base station apparatus as a synchronization master, if the wired network of the first base station apparatus is valid, the base station apparatus can acquire the determination result of the synchronization state from the first base station.

The base station apparatus may be configured so that if the wireless communication unit fails to receive the synchronization signal from a first base station apparatus at a given reception timing, the wired communication unit transmits the synchronization state confirmation signal to a second base station apparatus other than the first base station apparatus, and receives the synchronization state response signal from the second base station apparatus.

According to this configuration, even if the base station apparatus fails to detect the synchronization signal transmitted from the first base station apparatus as a synchronization master, the base station apparatus can acquire the determination result of the synchronization state from the second base station apparatus. Further, even if the wired network of the first base station apparatus has no communication, the base station apparatus can acquire the determination result of the synchronization state.

The base station apparatus may be configured so that if the wired communication unit fails to receive the synchronization state response signal responsive to the synchronization state confirmation signal for the first base station apparatus, the wired communication unit transmits the synchronization state confirmation signal to the second base station apparatus which is a higher hierarchy than that of the first base station apparatus.

According to this configuration, the base station apparatus can acquire the determination result of the synchronization state with higher precision.

The base station apparatus may be configured so that the wired communication unit determines a target base station apparatus to which the synchronization state confirmation signal is transmitted based on information on priority order of the target base station apparatus, transmits the synchronization state confirmation signal to the determined target base station apparatus, and receives the synchronization state response signal from the target base station apparatus.

According to this configuration, the base station which requests the determination of the synchronization state is predetermined. Therefore, the determination result of the synchronization state can be acquired from the base station apparatus intended by a user The base station apparatus may be configured so that the wired communication unit transmits the synchronization state confirmation signal to other base station apparatuses in a descending priority order determined based on the information on priority order.

According to this configuration, even if the base station apparatus that cannot determine the synchronization state is present, the determination result of the synchronization state with high precision can be acquired.

The base station apparatus may be configured so that the synchronization state confirmation signal includes information on a time position at which the synchronization signal is transmitted from the base station apparatus.

According to this configuration, the base station which is a determination request destination of the synchronization state can recognize the temporal position of the synchronization signal transmitted by the base station apparatus of a determination request source.

The base station apparatus may be configured so that the synchronization state confirmation signal includes at least one of information on a transmission channel and a transmission slot through which the synchronization signal is transmitted from the base station apparatus.

According to this configuration, the base station which is a determination request destination of the synchronization state can recognize at least one of a specific transmission channel and a specific transmission slot of the synchronization signal transmitted by the base station apparatus of the determination request source, and can receive the synchronization state confirmation signal with high precision.

The base station apparatus may be configured so that the synchronization state response signal includes information on a direction and a value of a temporal deviation between the base station apparatus and the another base station apparatus which is a destination of the synchronization state confirmation signal.

According to this configuration, the base station apparatus of the determination request source which is in the synchronization state can recognize detailed information on the temporal deviation from the base station apparatus of the determination request destination which is in the synchronization state, and therefore can be synchronized with the other base station apparatuses with high precision.

The base station apparatus may be configured so that the wired communication unit periodically transmits the synchronization state confirmation signal at given time intervals.

According to this configuration, a possibility of determining the synchronization state according to the synchronization state confirmation signal becomes high.

The base station apparatus may be configured so that a learning processing unit that measures a temporal deviation between the base station apparatus and the another base station apparatus in an asynchronous state where the base station apparatus and the another base station apparatus are asynchronous with each other; and a correction parameter determination unit that determines a correction parameter for correcting the communication timing by the communication timing correction unit based on information on the temporal deviation measured by the learning processing unit.

According to this configuration, a tendency of the temporal deviation in the asynchronous state can be recognized in advance.

The base station apparatus may be configured so that if the wireless communication unit fails to receive the synchronization signal from the another base station apparatus at the given reception timing, the communication timing correction unit corrects the communication timing based on the correction parameter determined by the correction parameter determination unit.

According to this configuration, even if the synchronization signal is undetected, the communication timing can be corrected with high precision according to the tendency of the temporal deviation recognized in advance.

The base station apparatus may be configured so that the correction parameter determination unit corrects the correction parameter based on the synchronization state response signal.

According to this configuration, it can be verified how much the precision of the corrected communication timing is according to the tendency of the temporal deviation by acquiring the synchronization state response signal. Also, even if the correction of the communication timing corresponding to the tendency of the temporal deviation is insufficient, the base station apparatus can be synchronized with the other base station apparatus with high precision. Further, the base station apparatus can be synchronized with the other base station apparatuses taking actual wireless communication environments into account.

The base station apparatus may be configured so that the synchronization signal includes synchronization information for synchronizing a plurality of base station apparatuses with each other, and identification information of the base station apparatus which is a source of the synchronization signal.

According to this configuration, the source of the synchronization signal can be recognized with higher precision as compared with a case in which the synchronization signal of the base station apparatus is recognized by only the synchronization signal.

The base station apparatus may be configured so that the wireless communication unit transmits the synchronization state confirmation signal to a communication terminal that communicates with the base station apparatus, and receives the synchronization state response signal from the communication terminal.

According to this configuration, the synchronization state between the base station apparatus of the determination request source which is in the synchronization state and the base station of the determination request destination can be determined by using the communication terminal.

The base station apparatus may be configured so that if the wired communication unit fails to receive the synchronization state response signal from the another base station apparatus, the wireless communication unit transmits the synchronization state confirmation signal to the communication terminal.

According to this configuration, the synchronization state between the base station apparatus of the determination request source which is in the synchronization state and the base station apparatus of the determination request destination can be determined by using the communication terminal.

The base station apparatus may be configured so that the synchronization state confirmation signal includes at least one of information on a transmission channel and a transmission slot through which the synchronization signal is transmitted from the another base station apparatus.

According to this configuration, the information on the specific time position of the synchronization signal transmitted by the base station apparatus of the determination request destination of the synchronization state can be recognized by the communication terminal.

The base station apparatus may be configured by further including a synchronization state determination unit that determines the synchronization state when the wired communication unit receives the synchronization state confirmation signal, wherein the synchronization state determination unit determines the synchronization state based on a difference between a reception timing of the synchronization signal received by the wireless communication unit and a scheduled reception timing of the synchronization signal, and the wired communication unit transmits the synchronization state response signal including a determination result of the synchronization state determined by the synchronization state determination unit.

According to this configuration, when the base station apparatus is requested by the other base station apparatus to determine the synchronization state, the base station apparatus can determine the synchronization state with high precision.

The base station apparatus may be configured so that the synchronization state determination unit determines the synchronization state based on a difference between a reception timing of the synchronization information included in the synchronization signal received by the wireless communication unit and a scheduled reception timing of the synchronization signal.

According to this configuration, the synchronization state can be determined with higher precision, based on the synchronization information included in the synchronization signal.

There is provided a communication system in which a plurality of base station apparatuses including a first base station apparatus and a second base station apparatus conducts a communication by a time-sharing system, wherein the first base station apparatus includes: a wireless communication unit that communicates with another base station apparatus through a wireless network; a wired communication unit that communicates with the another base station apparatus through a wired network; a communication timing determination unit that determines a communication timing of a communication signal communicated by the wireless communication unit; and a communication timing correction unit that corrects the communication timing determined by the communication timing determination unit, wherein if the wireless communication unit fails to receive a synchronization signal from the another base station apparatus at given reception timing, the wired communication unit transmits a synchronization state confirmation signal for confirming a synchronization state between the first base station apparatus and the second base station apparatus to another base station apparatus other than the first base station apparatus, the another base station apparatus receives the synchronization state confirmation signal through the wired network, determines the synchronization state based on a difference between a reception timing of the synchronization signal received through the wireless network and a scheduled reception timing of the synchronization signal, and transmits the synchronization state response signal including a determination result of the synchronization state, the wired communication unit receives the synchronization state response signal, and the communication timing correction unit corrects the communication timing based on the synchronization state response signal received by the wired communication unit.

According to this configuration, even if the first base station apparatus fails to detect the synchronization signal transmitted through the wireless network, the first base station apparatus requests another base station apparatus to determine the synchronization state through the wired network, and can acquire the determination result of the synchronization state. Accordingly, even if the first base station apparatus fails to receive the given synchronization signal, the plurality of base stations can be synchronized with each other with high precision. Also, when another base station apparatus is requested by the first base station apparatus to determine the synchronization state, the synchronization state can be determined with high precision.

The communication system may be configured by further including a communication terminal that communicates with the first base station apparatus, wherein the wireless communication unit transmits the synchronization state confirmation signal to the communication terminal, the communication terminal receives the synchronization state confirmation signal, determines the synchronization state between the first base station apparatus and the second base station apparatus based on a difference between a reception timing of the synchronization signal from the first base station apparatus and a reception timing of the synchronization signal from the second base station apparatus, and transmits the synchronization state response signal including a determination result of the synchronization state, and the wireless communication unit receives the synchronization state response signal from the communication terminal.

According to this configuration, the synchronization state between the base station apparatus of the determination request source which is in the synchronization state and the base station apparatus of the determination request destination can be determined by using the communication terminal. Also, when the base station apparatus is requested by the first base station apparatus to determine the synchronization state, the synchronization state can be determined with high precision.

There is provided a synchronization method in a base station apparatus that communicates with another base station apparatus by a time-sharing system, the synchronization method including: communicating with the another base station apparatus through a wireless network; communicating with the another base station apparatus through a wired network; determining a communication timing of a communication signal communicated by the wireless communication unit; and correcting the determined communication timing, wherein if a synchronization signal from the another base station apparatus fails to be received at given reception timing through the wireless network, a synchronization state confirmation signal for confirming a synchronization state between the base station apparatus and the another base station apparatus is transmitted, and a synchronization state response signal including a determination result of the synchronization state is received, and the communication timing is corrected based on the received synchronization state response signal.

According to this method, even if the base station apparatus fails to detect the synchronization signal transmitted through the wireless network, the base station apparatus requests another base station apparatus to determine the synchronization state through the wired network, and can acquire the determination result of the synchronization state. Accordingly, even if the base station apparatus fails to receive the given synchronization signal, the plurality of base stations can be synchronized with each other with high precision.

The present application is based upon and claims the benefit of Japanese patent application No. 2012-096667 filed on Apr. 20, 2012, the contents of which are incorporated by reference in its entirety.

The present invention is useful for the base station apparatus, the communication signal, and the synchronization method in which the plurality of base stations can be synchronized with each other with high precision.

What is claimed is:

1. A base station apparatus that communicates with another base station apparatus by a time-sharing system, the base station apparatus comprising:
    a wireless transceiver that communicates with the another base station apparatus through a wireless network;
    a wired transceiver that communicates with the another base station apparatus through a wired network;
    a storage unit, the storage unit including a program, execution of the program determines a communication timing of a communication signal communicated by the wireless transceiver and corrects the communication timing of the communication signal communicated by the wireless transceiver, wherein
    if the wireless transceiver fails to receive a synchronization signal from the another base station apparatus at a given reception timing, the wired transceiver transmits to the another base station apparatus a synchronization state confirmation signal for confirming a synchronization state between the base station apparatus and the another base station apparatus, the synchronization state confirmation signal including at least one of information on a transmission channel and a transmission slot through which a synchronization signal is transmitted from the base station apparatus, and the wired transceiver receives from the another base station apparatus a synchronization state response signal including information on a temporal deviation of the base station apparatus relative to the another base station apparatus, and
    execution of the program corrects the communication timing of the communication signal communicated by the wireless transceiver based on the synchronization state response signal received by the wired transceiver.

2. The base station apparatus according to claim 1, wherein if the wireless transceiver fails to receive the synchronization signal from a first base station apparatus at a given reception timing, the wired transceiver transmits the synchronization state confirmation signal to the first base station apparatus, and receives the synchronization state response signal from the first base station apparatus.

3. The base station apparatus according to claim 1, wherein if the wireless transceiver fails to receive the synchronization signal from a first base station apparatus at a given reception timing, the wired transceiver transmits the synchronization state confirmation signal to a second base station apparatus other than the first base station apparatus, and receives the synchronization state response signal from the second base station apparatus.

4. The base station apparatus according to claim 3, wherein if the wired transceiver fails to receive the synchronization state response signal responsive to the synchronization state confirmation signal for the first base station apparatus, the wired transceiver transmits the synchronization state confirmation signal to the second base station apparatus which is a higher hierarchy than that of the first base station apparatus.

5. The base station apparatus according to claim 1, wherein the wired transceiver determines a target base station apparatus to which the synchronization state confirmation signal is transmitted based on information on priority order of the target base station apparatus, transmits the synchronization state confirmation signal to the determined target base station apparatus, and receives the synchronization state response signal from the target base station apparatus.

6. The base station apparatus according to claim 5, wherein the wired transceiver transmits the synchronization state confirmation signal to other base station apparatuses in a descending priority order determined based on the information on priority order.

7. The base station apparatus according to claim 1, wherein the synchronization state confirmation signal includes information on a time position at which the synchronization signal is transmitted from the base station apparatus.

8. The base station apparatus according to claim 1, wherein the synchronization state response signal includes information on a direction and a value of the temporal deviation between the base station apparatus and the another base station apparatus which is a destination of the synchronization state confirmation signal.

9. The base station apparatus according to claim 1, wherein the wired transceiver periodically transmits the synchronization state confirmation signal at given time intervals.

10. The base station apparatus according to claim 1, wherein:
execution of the program measures the temporal deviation between the base station apparatus and the another base station apparatus in an asynchronous state where the base station apparatus and the another base station apparatus are asynchronous with each other and execution of the program determines a correction parameter for correcting the communication timing of the communication signal communicated by the wireless transceiver based on information on the temporal deviation.

11. The base station apparatus according to claim 10, wherein
if the wireless transceiver fails to receive the synchronization signal from the another base station apparatus at the given reception timing, the execution of the program corrects the communication timing of the communication signal communicated by the wireless transceiver based on the correction parameter.

12. The base station apparatus according to claim 10, wherein
the execution of the program corrects the correction parameter based on the synchronization state response signal.

13. The base station apparatus according to claim 1, wherein
the synchronization signal includes synchronization information for synchronizing a plurality of base station apparatuses with each other, and identification information of the base station apparatus which is a source of the synchronization signal.

14. The base station apparatus according to claim 1, wherein
the wireless transceiver transmits the synchronization state confirmation signal to a communication terminal that communicates with the base station apparatus, and receives the synchronization state response signal from the communication terminal.

15. The base station apparatus according to claim 14, wherein
if the wired transceiver fails to receive the synchronization state response signal from the another base station apparatus, the wireless transceiver transmits the synchronization state confirmation signal to the communication terminal.

16. The base station apparatus according to claim 1, wherein execution of the program determines a synchronization state between the base station apparatus and a first base station apparatus, when the wired transceiver receives a synchronization state confirmation signal from the first base station apparatus, wherein
execution of the program determines a synchronization state between the base station apparatus and the first base station apparatus based on a difference between a reception timing of a synchronization signal received by the wireless transceiver from the first base station apparatus and a scheduled reception timing of the synchronization signal from the first base station apparatus, and
the wired transceiver transmits a synchronization state response signal to the first base station apparatus including a determination result of the synchronization state between the base station apparatus and the first base station determined by the execution of the program.

17. The base station apparatus according to claim 16, wherein
execution of the program determines the synchronization state between the base station apparatus and a first base station apparatus based on a difference between a reception timing of synchronization information included in the synchronization signal received by the wireless transceiver from the first base station apparatus and a scheduled reception timing of the synchronization signal from the first base station apparatus.

18. A communication system in which a plurality of base station apparatuses including a first base station apparatus and a second base station apparatus conducts a communication by a time-sharing system, wherein
the first base station apparatus comprises:
a wireless transceiver that communicates with another base station apparatus through a wireless network;
a wired transceiver that communicates with the another base station apparatus through a wired network;
a storage unit, the storage unit including a program, execution of the program determines a communication timing of a communication signal communicated by the wireless transceiver and corrects the communication timing of the communication signal communicated by the wireless transceiver, wherein
if the wireless transceiver of the first base station apparatus fails to receive a synchronization signal from the another base station apparatus at a given reception timing, the wired transceiver transmits a synchronization state confirmation signal for confirming a synchronization state between the first base station apparatus and the second base station apparatus to the another base station apparatus other than the first base station apparatus, the synchronization state confirmation signal including at least one of information on a transmission channel and a transmission slot through which a synchronization signal is transmitted from the first base station apparatus,
the another base station apparatus receives the synchronization state confirmation signal through the wired network, determines the synchronization state based on a difference between a reception timing of the synchronization signal received through the wireless network and a scheduled reception timing of the synchronization signal, and transmits a synchronization state response signal including information on a temporal deviation of the base station apparatus relative to the another base station apparatus, the wired transceiver receives from the another base station apparatus the synchronization state response signal, and execution of the program corrects the communication timing of the communication signal communicated by the wireless transceiver based on the synchronization state response signal received by the wired transceiver.

19. The communication system according to claim 18, further comprising:

a communication terminal that communicates with the first base station apparatus, wherein the wireless transceiver transmits the synchronization state confirmation signal to the communication terminal, the communication terminal receives the synchronization state confirmation signal, determines the synchronization state between the first base station apparatus and the second base station apparatus based on a difference between a reception timing of the synchronization signal from the first base station apparatus and a reception timing of the synchronization signal from the second base station apparatus, and transmits the synchronization state response signal including a determination result of the synchronization state, and the wireless transceiver receives the synchronization state response signal from the communication terminal.

20. A synchronization method in a base station apparatus that communicates with another base station apparatus by a time-sharing system, the synchronization method comprising:

communicating with the another base station apparatus through a wireless network;

communicating with the another base station apparatus through a wired network;

determining a communication timing of a communication signal communicated by a wireless transceiver; and correcting the determined communication timing, wherein if a synchronization signal from the another base station apparatus fails to be received by the base station apparatus at a given reception timing through the wireless network, a synchronization state confirmation signal for confirming a synchronization state between the base station apparatus and the another base station apparatus is transmitted by the base station apparatus through the wired network, the synchronization state confirmation signal including at least one of information on a transmission channel and a transmission slot through which a synchronization signal is transmitted from the base station apparatus, and the base station apparatus receives from the another base station apparatus through the wired network a synchronization state response signal including information on temporal deviation of the base station apparatus relative to the another base station apparatus, and the communication timing is corrected based on the received synchronization state response signal.

* * * * *